United States Patent [19]
Kobayashi

[11] Patent Number: 5,080,641
[45] Date of Patent: Jan. 14, 1992

[54] TORQUE SPLIT CONTROL SYSTEM FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 589,311

[22] Filed: Sep. 27, 1990

[30] Foreign Application Priority Data

| Oct. 20, 1989 | [JP] | Japan | 1-274594 |
| Oct. 20, 1989 | [JP] | Japan | 1-274595 |
| Oct. 20, 1989 | [JP] | Japan | 1-274596 |
| Oct. 20, 1989 | [JP] | Japan | 1-274597 |

[51] Int. Cl.⁵ .............................................. F16H 1/42
[52] U.S. Cl. ................................... 475/249; 475/221; 475/323; 475/344; 180/249
[58] Field of Search ............... 475/221, 248, 249, 323, 475/330, 332, 344; 180/248, 249

[56] References Cited

U.S. PATENT DOCUMENTS

| 4,457,394 | 7/1984 | Suzuki | 475/221 X |
| 4,612,824 | 9/1986 | Rühle | 475/221 X |
| 4,650,202 | 3/1987 | Tsuzuki | 180/248 |
| 4,760,964 | 8/1988 | Burandt | 475/332 X |
| 4,819,506 | 4/1989 | Matsumoto | 475/249 X |

FOREIGN PATENT DOCUMENTS 63-176728 7/1988 Japan.

Primary Examiner—Leslie A. Braun
Assistant Examiner—Benjamin Levi

[57] ABSTRACT

A central differential for splitting output torque of a transmission is formed by a complex planetary device. The planetary device comprises an input sun gear operatively connected with an output shaft of the transmission, a plurality of output sun gears, a carrier, and a pinion member comprising a plurality of planetary pinions integral with each other and rotatably supported on the carrier. Fluid operated friction clutches are provided for selectively connecting one of the output sun gears to an output member of the central differential.

6 Claims, 18 Drawing Sheets

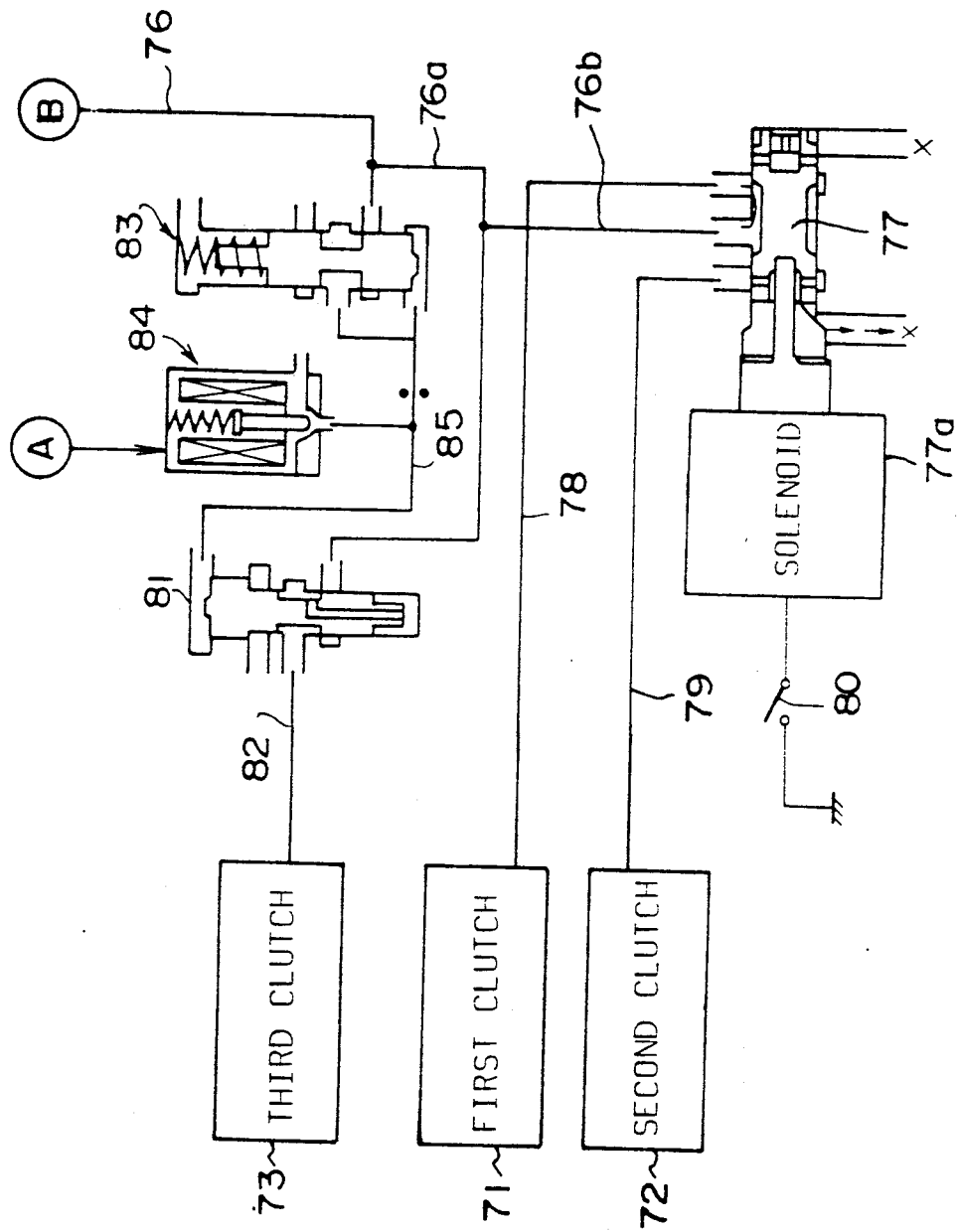

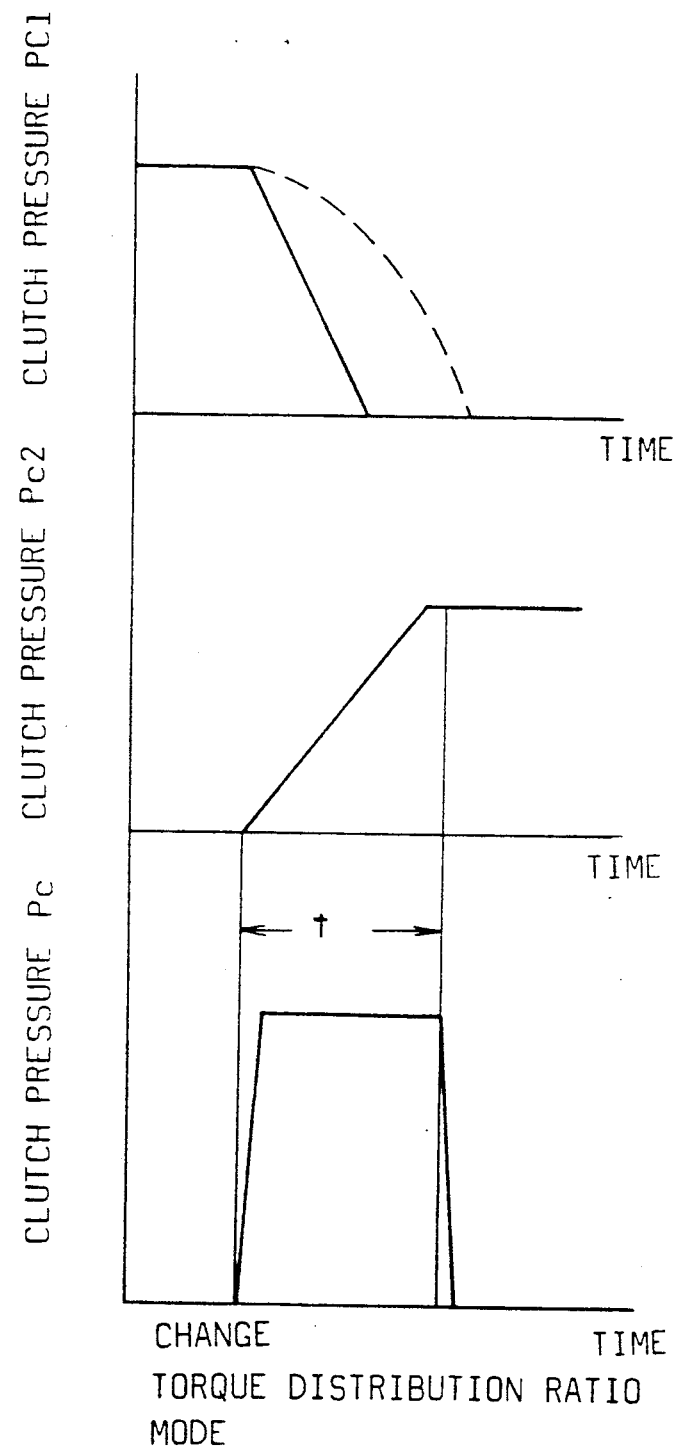

TORQUE SPLIT CONTROL SYSTEM FOR A FOUR-WHEEL DRIVE MOTOR VEHICLE

BACKGROUND OF THE INVENTION

The present invention relates to a torque split control system for a four-wheel drive motor vehicle having a central differential, and more particularly to a control system which provides two or more standard torque split ratios.

In a four-wheel drive motor vehicle, a torque split ratio between front and rear wheels is determined to coincide with a dynamic weight ratio of the front and rear wheels, so that power of the engine is effectively used at acceleration.

In a four-wheel drive motor vehicle based on a front-wheel drive with a front-mounted engine which has a static weight ratio of 60 (front):40 (rear), the ratio of the front torque $T_F$ to the front wheels and the rear torque $T_R$ to the rear wheels is determined in the ratio of 50:50 which is the same as a dynamic weight ratio thereof. In the four-wheel drive motor vehicle based on a rear-wheel drive with the front-mounted engine which has the static weight ratio of 50:50, the ratio of the front torque $T_F$ and the rear torque $T_R$ is determined 40:60 in the same ratio as the dynamic weight ratio. Accordingly, a central differential comprising bevel gears is employed in the former vehicle in which an output torque of the engine is equally distributed, and the central differential having a simple planetary gear device is employed in the latter vehicle.

The former vehicle ensures safe driving on a slippery road. If a differential lock device is provided for locking the central differential, the driving force of the vehicle is more improved. However, the steering ability of the vehicle is not particularly improved. That is, when the vehicle makes a turn at high speed under a differential lock condition, all four wheels may slip (slipping spin) at the same time, causing difficulty in driving.

In order to ensure driving stability of the vehicle, the torque to the rear wheels is set to a larger value than that to the front wheels by arranging the central differential with the simple planetary gear device, so that the rear wheels may slip first. Thus, the vehicle can be safely driven by the front wheels at a small torque while a power transmission to the rear wheels occurs, causing idling thereof.

Japanese Patent Application Laid-Open 63-176728 discloses a four-wheel drive motor vehicle in which a central differential comprising a simple planetary gear device is provided. An output of a transmission is transmitted to a carrier of the simple planetary gear device. The torque is split to the front wheels through either a sun gear or a ring gear and to the rear wheels through the other gear. The torque to the front and rear wheels is unequally split at the ratio determined by the difference between pitch circles of the sun gear and the ring gear. A fluid operated multiple-disk friction clutch as a lock device is provided for controlling the differential operation. A standard torque split ratio determined by the ratio of the pitch circles can not be changed, unless the diameters of the sun gear and the ring gear changes.

In order to increase the standard torque split ratio, the diameter of the sun gear is decreased or that of the ring gear is increased. However, in a power transmitting system where an axle differential for front or rear axles and the central differential are coaxially disposed, a plurality of shafts such as axles, a front drive shaft, an input shaft connected to the transmission and a rear drive shaft are disposed so as to penetrate the sun gear. Therefore, the diameter of the sun gear cannot be decreased. On the other hand, the ring gear cannot be large because of the limitation of space and of the required gear ratio. Consequently, the power transmitting system cannot be applied to various vehicles having different static weight ratio, such as a four wheel drive motor vehicle based on a front-wheel drive vehicle with a front-mounted engine, and the four wheel drive motor vehicle based on a rear-wheel drive vehicle with a rear-mounted and mid-shipped engine.

Moreover, since the split of torque to the rear wheels can not be set to a large value, the control range of the multiple-disk friction clutch becomes small. Consequently, a motor vehicle having good driveability and steerability can not be provided.

To the contrary, it is desirable for the standard torque split ratio to be able to be freely determined without dimensional restrictions so as to transmit a sufficient torque to the rear wheels. The driveability of the vehicle such as stability, cornering performance and steering feeling changes in dependency on whether the vehicle is driven in an understeering condition or in an oversteering condition. However, when only one standard torque split ratio is provided, only one of the conditions can be set, so that it is difficult to comply with various road conditions and other driving conditions. Thus, in order to drive the vehicle in a manner appropriate to the driving conditions, it is preferable to provide a plurality of the standard torque split ratios.

SUMMARY OF THE INVENTION

An object of the present invention is to provide a torque split control system for a four-wheel drive motor vehicle, in which a standard torque ratio of the front and rear wheels can be easily selected from two or more standard torque ratios in accordance with driving conditions.

Another object of the present invention is to provide a system in which a restricting operation of a central differential is controlled by a fluid operated multiple-disk clutch when the wheels of the vehicle slip.

Another object of the present invention is to provide a compact torque split control system by employing a complex planetary gear device and a plurality of fluid operated multiple-disk clutches.

According to the present invention, there is provided a system for controlling torque split for a four-wheel drive vehicle having a transmission, a central differential for splitting output torque of the transmission at a predetermined ratio, power trains for transmitting the split torques from output members of the central differential to the front and rear wheels of the vehicle.

The central differential comprises an input sun gear operatively connected with an output shaft of the transmission, a plurality of output sun gears coaxial with the input sun gear, a carrier operatively connected to a set of driving wheels of the vehicle, a pinion member comprising a plurality of planetary pinions which are different in the number of teeth and integral with each other and rotatably supported on the carrier, each of the planetary pinions being engaged with the corresponding sun gear, and an output member operatively connected to another set of driving wheels. Selecting means is provided for selectively connecting one of the output sun gears to the output member, and a control unit is provided for operating the selecting means in accordance with driving conditions of the vehicle so as to select one of the output sun gears.

In an aspect of the invention, the selecting means includes fluid operated friction clutches. The input sun gear and the selected one of the output sun gears are equal in the number of teeth and in module, and the pinion engaged with the input sun gear and the pinion engaged with the selected output sun gear are equal in the number of teeth and in module.

The fluid operated multiple-disk clutch is provided to restrict the differential operation of the central differential.

The other objects and features of this invention will become understood from the following description with reference to the accompanying drawings.

BRIEF DESCRIPTION OF DRAWINGS

FIGS. 4a and 4b show a circuit of a control system for hydraulic clutches of the clutch device;

FIGS. 8a, 8b and 8c are graphs showing clutch pressures in first, second and third clutches of the clutch device in the control system of the second embodiment;

DETAILED DESCRIPTION OF THE PREFERRED EMBODIMENTS

Figure 1:
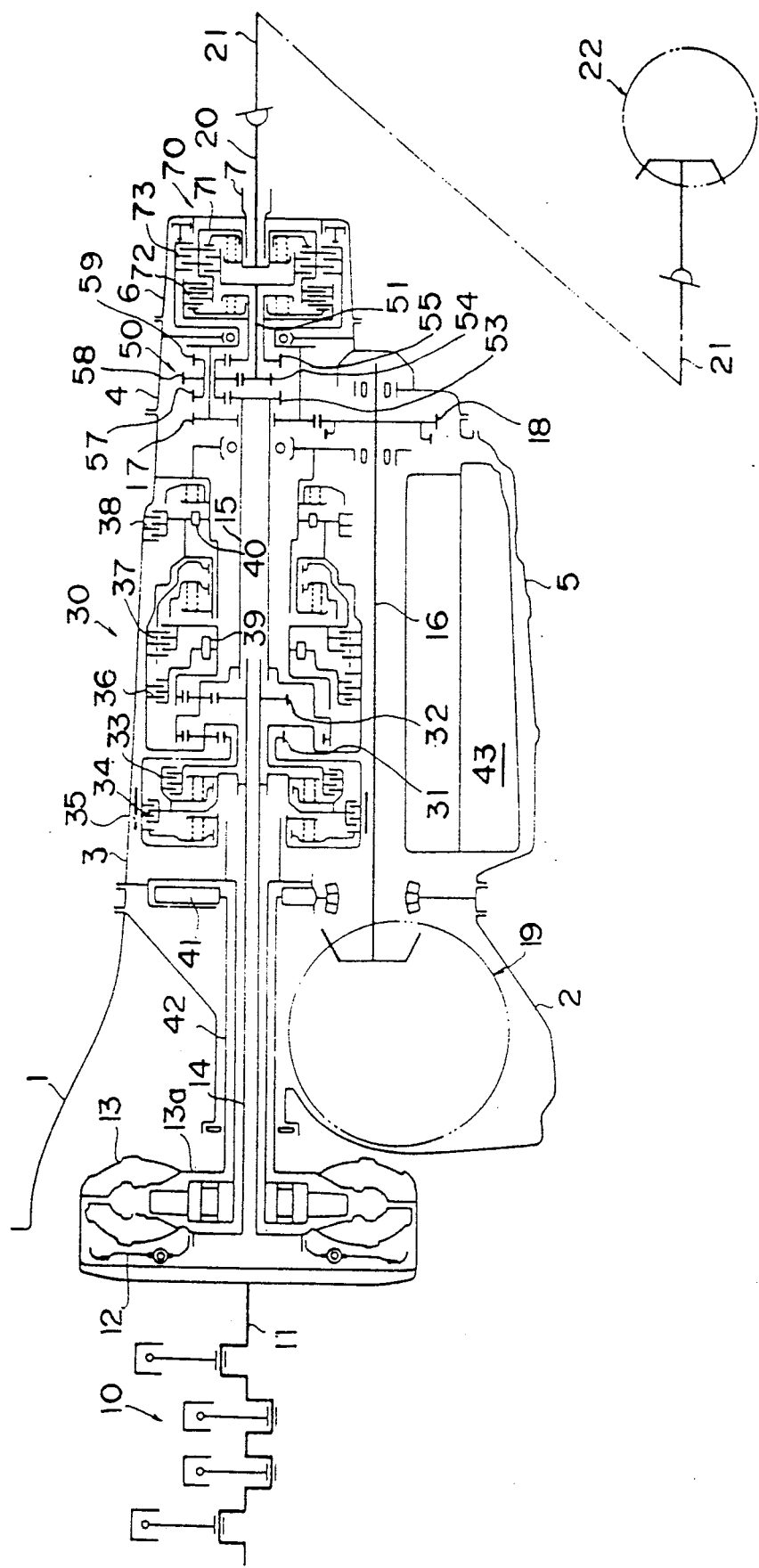
FIG. 1 shows a schematic diagram of a power transmission system for a four-wheel drive motor vehicle of a first embodiment of the present invention.

FIG. 1 shows a power transmission system in a transaxle type for a four-wheel drive motor vehicle having an engine 10 at a front portion thereof. The power transmission system has a torque converter 13 with a lockup clutch 12 mounted in a converter box 1, and a front differential 19 mounted in a differential box 2 behind the torque converter 13. A transmission case 3 housing an automatic transmission 30 is attached to a rear of the differential box 2. An oil pan 5 is attached to an underside of the transmission case 3. A crankshaft 11 of the engine 10 is operatively connected with the torque converter 13. An input shaft 14 extends from a turbine of the torque converter 13 to the automatic transmission 30. An output of the automatic transmission 30 is transmitted to an output shaft 15 which is aligned with the input shaft 14 for rearwardly transmitting the torque. The output shaft 15 is connected to a front drive shaft 16 which is disposed in parallel under the automatic transmission 30 through a pair of reduction gears 17 and 18 of a central differential 50 housed in a transfer case 4. A fluid operated clutch device 70 housed in an intermediate case 6 is disposed behind the central differential 50. The front drive shaft 16 is connected to front wheels of the vehicle through a front differential 19. The output shaft 15 is connected to a rear drive shaft 20 provided in an extension case 7 through the central differential 50 and the clutch device 70. The rear drive shaft 20 is connected to rear wheels of the vehicle through a propeller shaft 21 and a rear differential 22. The automatic transmission 30 comprises two sets of single planetary gears consisting of a front planetary gear 31 and a rear planetary gear 32 for providing four forward speeds and one reverse speed. The automatic transmission has a high clutch 33, a reverse clutch 34, a brake band 35, a forward clutch 36, an overrunning clutch 37, a low and reverse clutch 38, and one-way clutches 39 and 40.

An oil pump 41 is provided in a front end of the transmission case 3. A pump drive shaft 42 is connected to an impeller 13a of the torque converter 13 and is operatively connected with a rotor of the oil pump 41.

In the oil pan 5, a control valve body 43 is provided for hydraulically actuating respective clutches and a brake of the transmission 30.

Figure 2A:
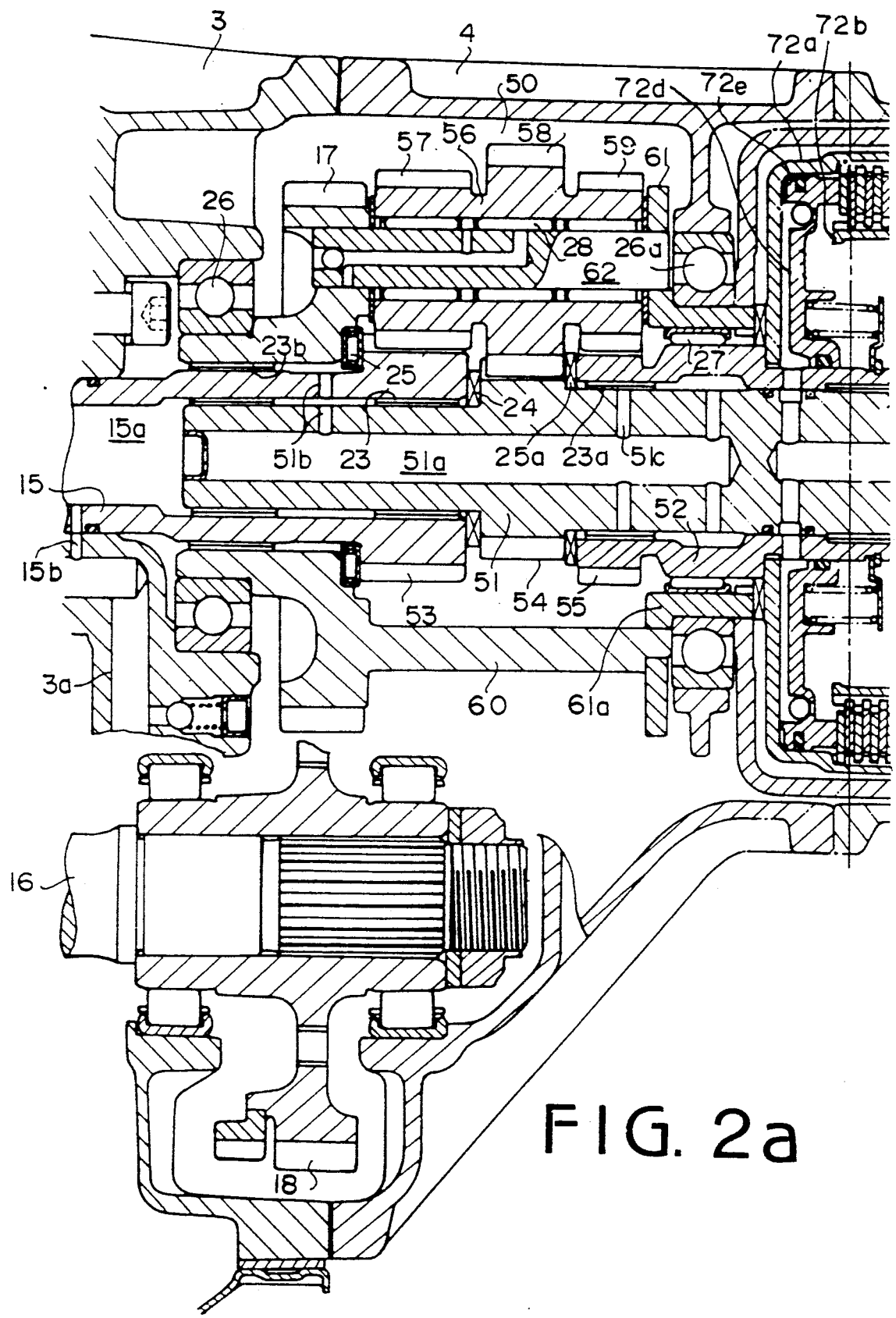
FIGS. 2a and 2b show an enlarged sectional view of a central differential and a fluid operated clutch device of the system.
Figure 2B:
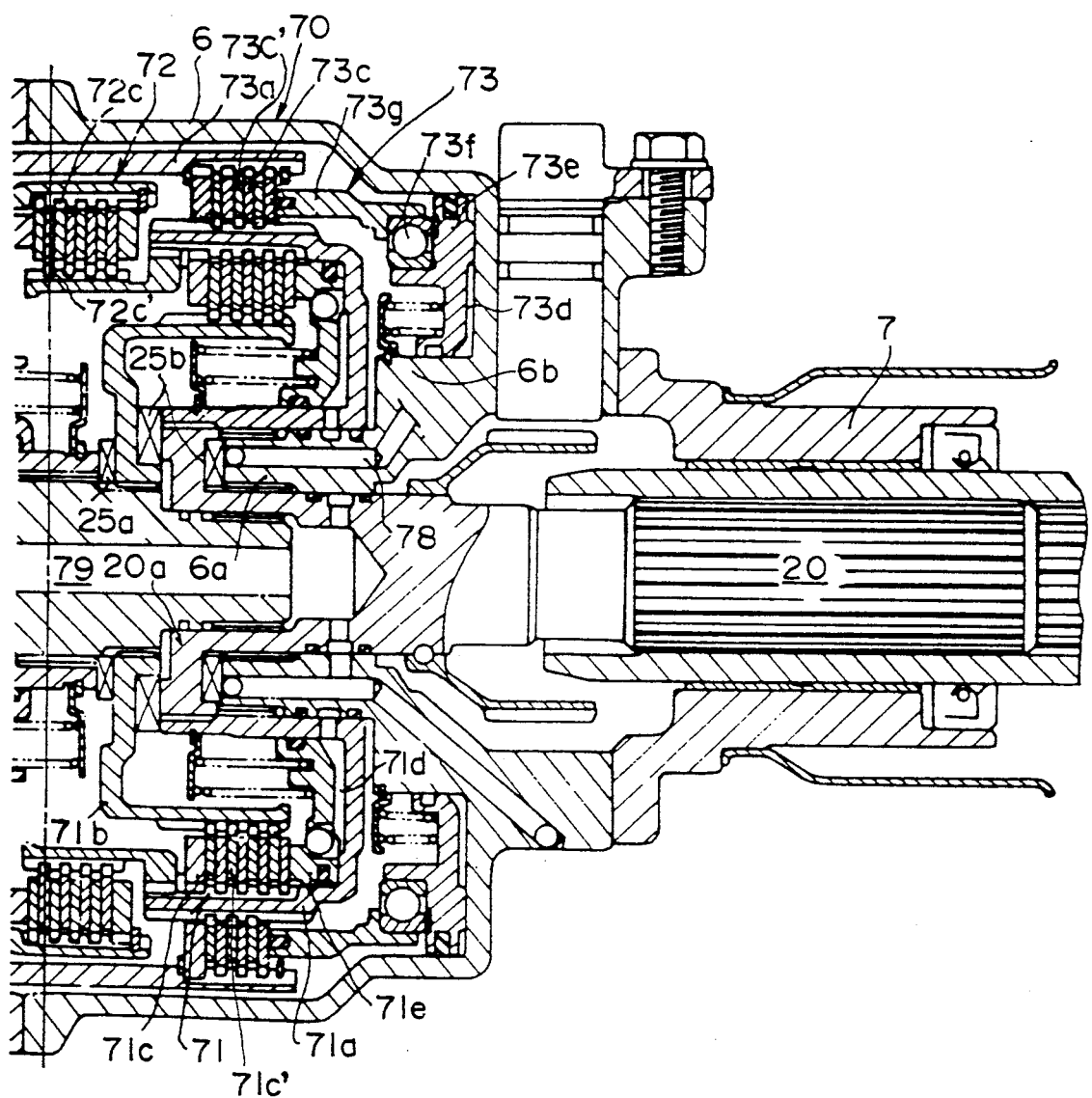

Referring to FIGS. 2a and 2b showing the central differential 50 and the clutch device 70, a first intermediate shaft 51 is rotatably mounted in the output shaft 15 at a front portion thereof through bushes 23 and a thrust washer 24. A rear portion of the intermediate shaft 51 is rotatably mounted in the rear drive shaft 20. A second intermediate shaft 52 is rotatably mounted on the rear portion of the first intermediate shaft 51 through bushes 23a. The reduction gear 17 is rotatably mounted on the output shaft 15 through a bush 23b and a thrust bearing 25. The reduction gear 17 and the output shaft 15 are mounted in the transmission case 3 through a ball bearing 26.

The central differential 50 is a complex planetary gear device and comprises a first sun gear 53 formed on the output shaft 15, a first planetary pinion 57 meshed with the first sun gear 53, a second sun gear 54 formed on the first intermediate shaft 51, a second planetary pinion 58 meshed with the second sun gear 54, a third sun gear 55 formed on the second intermediate shaft 52, a third planetary pinion 59 meshed with the third sun gear 55, and a carrier 61 secured to the reduction gear 17 through connecting members 60. The first to third planetary pinions 57 to 59 are integral with one another to form a pinion member 56. The pinion member 56 is rotatably mounted on a shaft 62 through needle bearings 28. The shaft 62 is secured to the gear 17 and the carrier 61. A boss 61a of the carrier 61 formed at the rear end thereof is rotatably mounted on the second intermediate shaft 52 through a bearing 27. The carrier 61 is rotatably supported in the transfer case 4 through a ball bearing 26a.

The fluid operated clutch device 70 in the intermediate case 6 comprises first and second fluid operated multiple disk friction clutches 71 and 72 for changing the standard torque split ratios to the front and the rear wheels, and a third fluid operated multiple-disk friction clutch 73 for restricting the operation of the central differential 50. The first clutch 71 is provided between the first intermediate shaft 51 and the rear drive shaft 20, and comprises a driven drum 71a splined on a hub 20a of the rear drive shaft 20 and rotatably mounted on a boss 6a of the intermediate case 6 formed at the inner portion thereof, and a drive drum 71b splined on the first intermediate shaft 51. A plurality of driven disks 71c are splined on the driven drum 71a and a plurality of drive disks 71c' are splined on the drive drum 71b, disposed alternately with the disks 71c. A ring piston 71e is slidably mounted on the inner wall of the driven drum 71a. The piston 71e engages with the end disks 71c. An oil chamber 71d is defined between the piston 71e and the driven drum 71a. When the oil is supplied to the chamber 71d, the piston 71e is pushed by the pressure of the oil. Thus, the disks 71c and 71c' are engaged with the adjacent disks to engage the clutch 71.

Thus, the output torque from the output shaft 15 of the transmission 30 is transmitted to the carrier 61 and the second sun gear 54 through the first sun gear 53 and the pinions 57, 58 at predetermined respective torque split ratios. The difference between the rotating speeds of the carrier 61 and the second sun gear 54 is absorbed by the rotation of the first and second planetary pinions 57 and 58. The torque is further transmitted to the rear drive shaft 20 through the first intermediate shaft 51 and the first clutch 71.

The second clutch 72 comprises a drive drum 72a secured to the second intermediate shaft 52 and a driven drum 72b securely mounted on an inner wall of the driven drum 71a of the first clutch 71. A plurality of drive disks 72c are splined on the drive drum 72a and a plurality of driven disks 72c' are splined on the driven drum 72b, disposed alternately with the disks 72c. A ring piston 72e is slidably mounted on the second intermediate shaft 52. The piston 72e engages with the end disk 72c. An oil chamber 72d is defined between the piston 72e and the drive drum 72a.

When the oil is supplied to the oil chamber 72d, the disks 72c and 72c' are engaged to engage the clutch 72, thereby coupling the second intermediate shaft 52 with the rear drive shaft 20 through driven drums 72b and 71a. Hence the output torque from the output shaft 15 of the transmission 30 is transmitted to the third sun gear 55 through the first sun gear 53 and the pinions 57 and 59 at predetermined respective torque split ratios. The difference between the rotating speeds of the carrier 61 and the third sun gear 55 is absorbed by the rotation of the first and third planetary pinions 57 and 59. The torque is further transmitted to the rear drive shaft 20 through the second intermediate shaft 52 and the second clutch 72 and the driven drum 71a of the first clutch 71. Thus, the first sun gear 53 acts as an input member, and the second and third sun gears act as output members.

The third clutch 73 has a drum 73a which is secured on the boss 61a of the carrier 61 of the central differential 50, and surrounds the driven drum 71a of the first clutch 71. A plurality of disks 73c splined on the drum 73a are alternately arranged with a plurality of disks 73c' which are splined on the outer periphery of the driven drum 71a of the first clutch 71. A piston 73e is slidably mounted on an inner wall 6b of the intermediate case 6. A retainer 73g mounted on the piston 73e through a release bearing 73f is abutted on the innermost disk 73c. An oil chamber 73d is formed between the piston 73e and the intermediate case 6.

When oil is supplied to the chamber 73d, the piston 73e is pushed by the pressure of the oil. The piston 73e pushes the retainer 73g which in turn pushes the disks 73c and 73c' to engage the clutch 73 for producing a clutch torque.

A pair of thrust bearings 25a are provided at both ends of the second intermediate shaft 52. Thrust bearings 25b are provided between the drive drum 71b and the flange 20a of the rear drive shaft 20 and between the flange 20a and the boss 6a of the intermediate case 6. Thus, each element can be freely rotated.

Oil passages 15a and 51a are formed in the output shaft 15 and the first intermediate shaft 51, respectively. Oil ports 51b and 51c are formed in the intermediate shaft 51. The lubricating oil is fed to the passage 51a from an oil passage 3a formed in the transfer case 3 through passages 15b and 15a, and further fed to bushes 23 for lubricating the bushes, the first sun gear 53 and pinions 57. An oil port 51c communicated with the passage 51a is provided for lubricating the bush 23a, thrust bearing 25a, second and third sun gears 54, 55 and pinions 58, 59.

An oil passage 78 is formed in the boss 6a of the intermediate case 6 for supplying oil to the oil chamber 71d of the first clutch 71. The oil chamber 72d of the second clutch 72 is supplied with oil through an oil passage 79 formed in the intermediate case 6, rear drive shaft 20 and the first imtermediate shaft 51.

Figure 3:
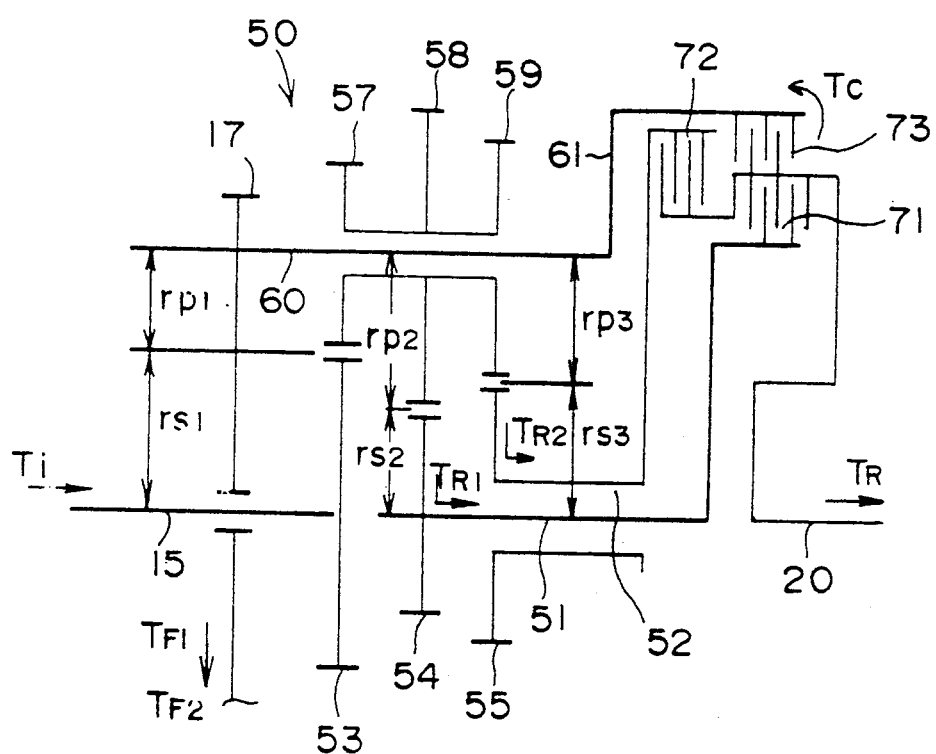
FIG. 3 a schematic view showing the central differential and the clutch device.

The operation of the central differential 50 for splitting the torque to the front and rear wheels will be described hereinafter with reference to FIG. 3.

An input torque Ti of the first sun gear 53 and the relationship between the sun gears and the pinions are expressed as follows, respectively.

$$T_i = T_{F1} + T_{R1} \tag{1}$$

$$T_i = T_{F2} + T_{R2} \tag{2}$$

$$r_{s1} + r_{p1} = r_{s3} + r_{p2} \tag{3}$$
$$= r_{s3} + r_{p3}$$

where $T_{F1}$ and $T_{F2}$ are the front torques transmitted from the carrier 61 to the front drive shaft 16, $T_{R1}$ is the rear torque transmitted from the second sun gear 54 to the rear drive shaft 20, $T_{R2}$ is the rear torque transmitted from the third sun gear 55 to the rear drive shaft 20, $rs\mu_1$ is the radius of the pitch circle of the first sun gear 53, $r_{p1}$, $r_{p2}$ and $r_{p3}$ are radii of pitch circles of first, second and third pinions 57, 58 and 59, respectively, and $r_{s2}$ and $r_{s3}$ are the radii of the pitch circles of the second and the third sun gears 54 and 55.

A tangential load P on the engaging point of the first sun gear 53 and the first pinion 57 is equal to the sum of a tangential load $P_1$ on the carrier 61 and a tangential load $P_2$ on the engaging point of the second sun gear 54 and the second pinion 58. The tangential load P is further equal to the sum of a tangential load $P_3$ on the carrier 61 and a tangential load $P_4$ on the point of the third sun gear 55 and the third pinion 59. That is, $$P = Ti/rs_1$$

$$P_1 = T_{F1}(rs_1 + rp_1)$$

$$P_2 = T_{R1}/rs_2$$

$$P_3 = T_{F2}/(rs_1 + rp_1)$$

$$P_4 = T_{R2}/(rs_3 + rp_3)$$

$$Ti/rs_1 = \{T_F/(rs_1 + rp_1)\} + T_R/rs_2 \quad (4)$$

$$Ti/rs_1 = \{T_{F2}/(rs_1 + rp_1)\} + T_{R2}/rs_3 \quad (5)$$

Substituting equations (1) to (3) for the equations (4) and (5), $$T_{F1} = (1 - rp_1 \cdot rs_2/rs_1 \cdot rp_2) \cdot Ti \quad (6)$$

$$T_{R1} = (rp_1 \cdot rs_2/rs_1 \cdot rp_2) \cdot Ti \quad (7)$$

$$T_{F2} = (1 - rp_1 \cdot rs_3/rs_1 \cdot rp_3) \cdot Ti \quad (8)$$

$$T_{R2} = (rp_1 \cdot rs_3/rs_1 \cdot rp_3) \cdot Ti \quad (9)$$

Consequently, it will be seen that the torque split for the front torque $T_F$ and the rear torque $T_R$ can be set to various values by changing the radii of the pitch circles of the sun gears 53 to 55 and the pinions 57 to 59. Furthermore, since three sets of sun gears and pinions are provided, two standard torque split ratios are obtained.

If $rs_1$ is 22.8 mm, $rp_1$ is 17.1 mm, $rp_2$ is 21.8 mm, $rs_2$ is 18.1 mm, $rp_3$ is 19.95 mm, and $rs_3$ is 19.95 mm, the front torque $T_F$ and the rear torque $T_R$ are calculated as $$T_{F1} = 0.38 Ti$$

$$T_{R1} = 0.62 Ti$$

$$T_{F2} = 0.25 Ti$$

$$T_{R2} = 0.75 Ti$$

Thus, the standard torque split ratios of the front wheels and the rear wheels are $$T_{F1} : T_{R1} \approx 38 : 62$$

$$T_{F2} : T_{R2} \approx 25 : 75$$

A large torque can be distributed to the rear wheels, and particularly at the second torque split ratio, a larger torque is distributed to the rear wheels as in the rear-drive vehicle.

Figure 4A:
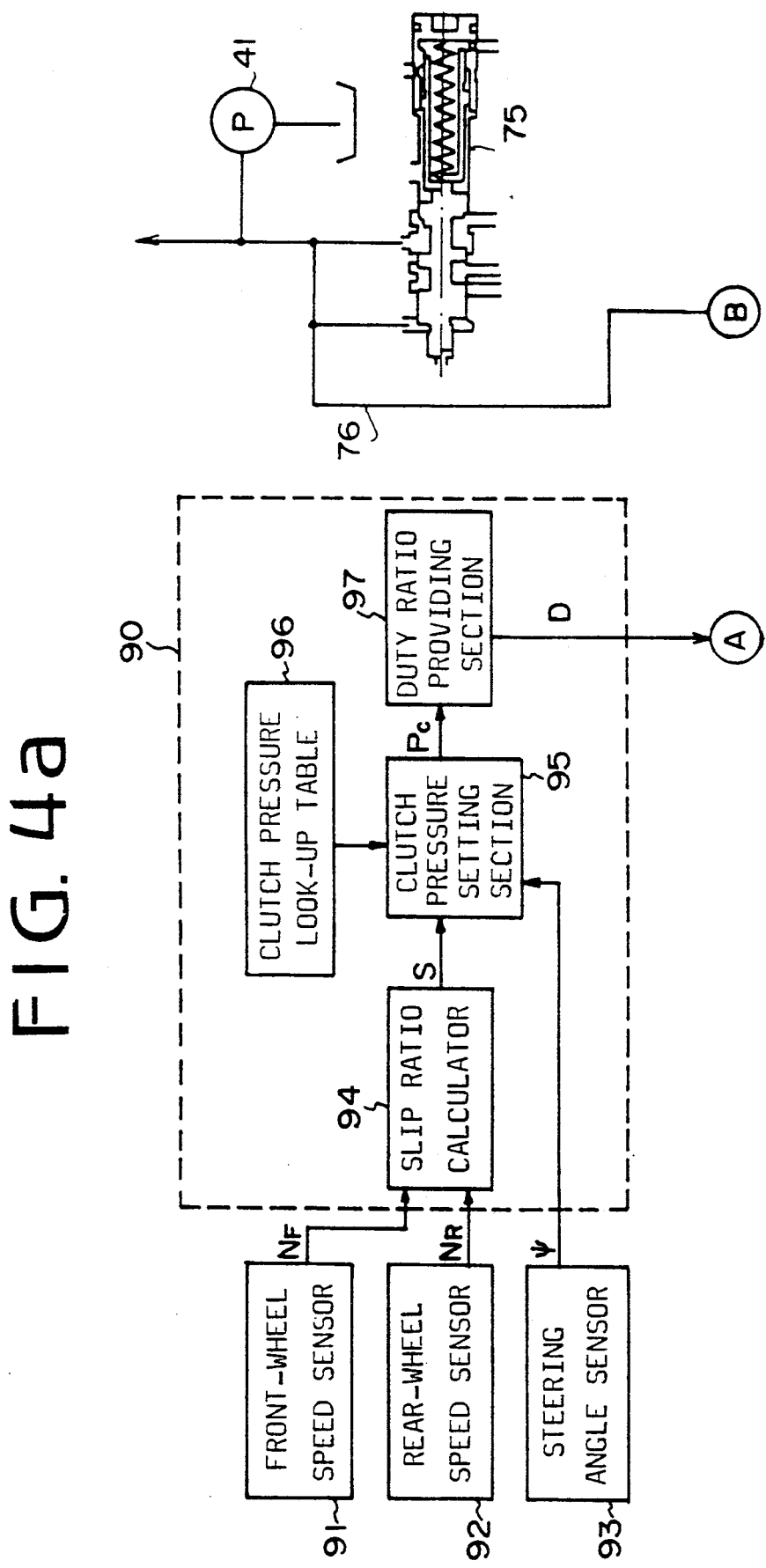

Referring to FIGS. 4a and 4b showing a control system for the clutches 71, 72, 73, the oil pressure control unit of the control system comprises a pressure regulator valve 75, a pilot valve 83, a clutch control valve 81 and a solenoid operated duty control valve 84 for controlling the third fluid operated multiple-disk clutch 73. The regulator valve 75 operates to regulate the pressure of oil supplied from the oil pump 41 driven by the engine 10 to produce a predetermined line pressure and a lubricating oil pressure. An actuating pressure conduit 76 is communicated with a passage 85 through the pilot valve 83. The passage 85 is communicated with the solenoid operated duty control valve and with an end port of the clutch control valve 81. The conduit 76 is communicated with the clutch control valve 81 through a passage 76a. The clutch control valve 81 is communicated with the third clutch 73 through the passage 82. The solenoid operated valve 84 is operated by pulses from a control unit 90 at a duty ratio determined therein, so as to control draining the oil to provide a control pressure. The control pressure is applied to an end of a spool of the clutch control valve 81 to control the oil supplied to the clutch 73 so as to control the clutch pressure (torque). The passage 76a is further communicated with a changeover valve 77 through a passage 76b. The changeover valve 77 has a solenoid 77a which is energized when a manual switch 80 connected thereto is closed. The changeover valve 77 is thus operated to selectively communicate the passage 76a with the oil chamber 71d of the first clutch 71 through a passage 78 or the oil chamber 72d of the second clutch 72 through a passage 79.

The control unit 90 is supplied with the output signal from a front-wheel speed sensor 91, a rear-wheel speed sensor 92 and a steering angle sensor 93.

The control unit 90 has a slip ratio calculator 94 to which the front-wheel and rear-wheel speeds $N_F$ and $N_R$ are applied. Since the standard torque split is determined in accordance with the principle of $T_F < T_R$, the rear wheels slip first (slipping spin). A slip ratio S is calculated in accordance with the ratio of the front-wheel speed $N_F$ to the rear-wheel speed $N_R$, $S = N_F/N_R (S > 0)$. The slip ratio S, and a steering angle $\psi$ from the sensor 93 are applied to a clutch pressure setting section 95. In accordance with the input signals, the clutch pressure setting section 95 retrieves a clutch pressure Pc from a clutch pressure look up table 96. When the slip ratio S is $S \geq 1$, the clutch pressure Pc is set to a small value. When the rear wheels slip and the slip ratio S becomes $S < 1$, the clutch pressure Pc (clutch torque) increases with a decrease of the slip ratio S. When the slip ratio S becomes smaller than a set value SI, the clutch pressure Pc is set to a maximum Pcmax. Further, when the steering angle $\psi$ increases, the clutch pressure Pc is decreased, thereby preventing tight corner braking.

The clutch pressure Pc is applied to a duty ratio providing section 97 where a duty ratio D corresponding to the derived clutch pressure Pc is provided. A duty signal with a duty ratio D provided at the section 97 is applied to the solenoid operated duty control valve 84.

Figure 5A:
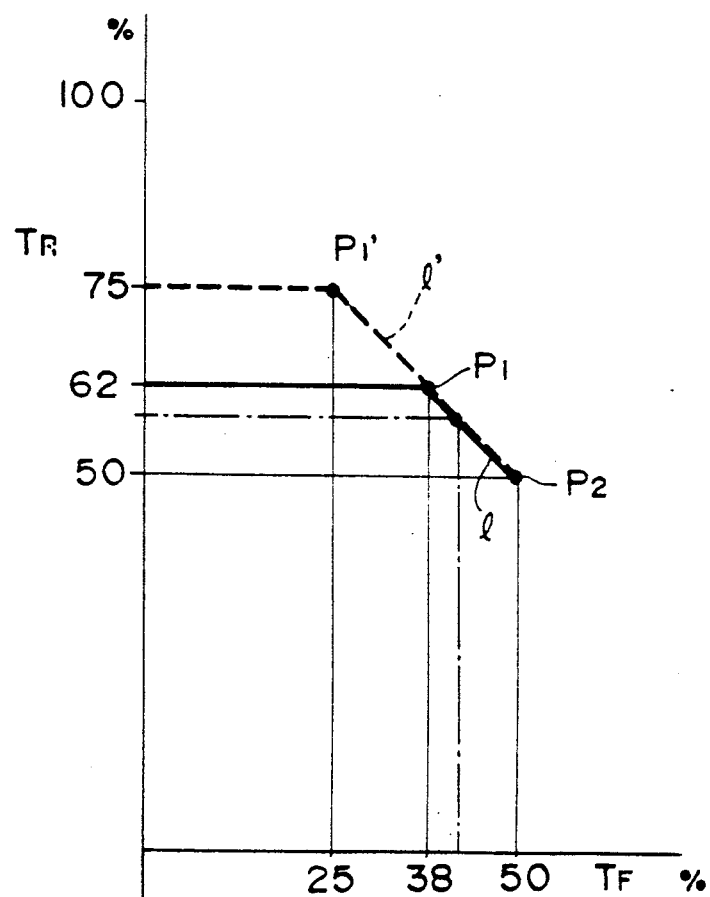
FIG. 5a is a graph showing a relationship between front torque and rear torque.
Figure 5B:
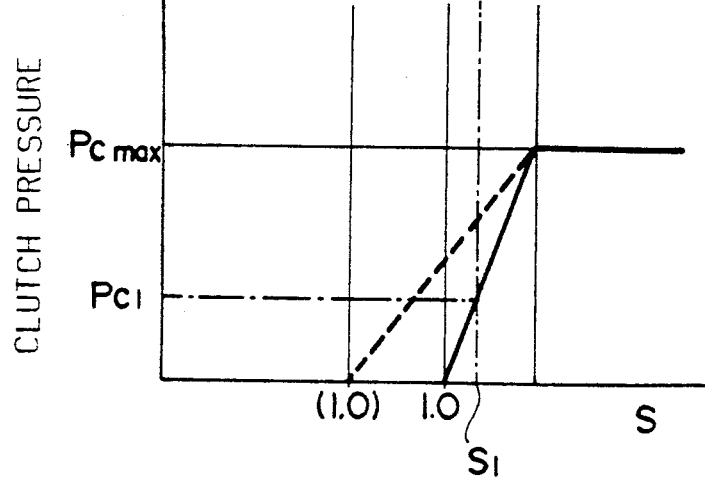
FIG. 5b graph showing characteristics of a clutch pressure in accordance with a slip ratio.

Describing the operation of the system with reference to FIGS. 5a and 5b, the power of the engine 10 is transmitted through the torque converter 13 and the input shaft 14 to the transmission 30 at which the transmission ratio is automatically controlled. The output of the transmission 30 is transmitted to the first sun gear 53 of the central differential 50.

In order to stably drive the vehicle on roads in general, the manual switch 80 is opened so that the changeover valve 77 is operated to communicate the passage 76b with the passage 78. The first clutch 71 is engaged, thereby to connect the second sun gear 54 of the central differential 50 with the rear drive shaft 20 through the first intermediate shaft 51 and the clutch 71. Thus, the first mode, wherein the torque is distributed in accordance with the first standard torque split ratio is selected. Namely, the standard torque split ratio is $T_{F1} : T_{R1} \approx 38:62$, dependent on the radii of the first and second sun gears 53, 54 and the pinions 57, 58. Thus, 38% of the output torque of the transmission 30 is transmitted to the front wheels through the carrier 61, the reduction gears 17, 18, the first drive shaft 16 and the front differential 19. Meanwhile, 68% of the torque is transmitted to the rear wheels through the second sun gear 54, first intermediate shaft 51, first clutch 71, the rear drive shaft 20, the propeller shaft 21 and the rear differential 22. Thus, the four-wheel driving is established.

A slip ratio S is calculated in accordance with the front wheel speed $N_F$, the rear-wheel speed $N_R$ and the steering angle $\psi$. If a no slip state is detected in the control unit 90 while the vehicle is driven on a dry road ($S \geq 1$), a low clutch pressure Pc is set in the clutch pressure setting section 95 so that a signal corresponding to the duty ratio of 100% is applied from the duty ratio providing section 97 to the solenoid operated duty control valve 84. Thus, the clutch control pressure becomes zero and the clutch control valve 81 operates to close the passage 76a, thereby draining the oil from the third clutch 73. The clutch 73 is disengaged and the clutch torque becomes zero so as to render the central differential 50 free.

Accordingly, the torque split to the front and rear wheels becomes the same as the standard split ratio $T_{F1} : T_{R1}$ as shown at a point $P_1$ of the graph of FIG. 5a.

At the first standard torque split ratio, the vehicle is driven under the understeering condition, so that good operability of the vehicle is ensured. Further, the vehicle smoothly negotiates a sharp corner by the differential operation of the central differential 50.

If the vehicle is driven on a slippery road, the rear wheels slip first because a larger amount of the torque is distributed to the rear wheels. The slip ratio $S_1$ is calculated at the slip ratio calculator 94 of the control unit 90. A duty signal corresponding to a clutch pressure $Pc_1$ in accordance with the slip ratio $S_1$ ($S < 1$) is applied to the solenoid operated valve 84. The clutch control valve 81 is operated by the control pressure of oil obtained by regulating the line pressure at the solenoid operated valve 84, so that the third clutch 73 is engaged at the clutch pressure. Consequently, the clutch torque Tc is produced in the clutch 73. The clutch 73 is provided in parallel with the carrier 61 and the second sun gear 54 of the central differential 50. Accordingly, the clutch torque $Tc_1$ corresponding to the slip ratio $S_1$ is transmitted from the second sun gear 54 to the carrier 61 to increase the torque to the front wheels. Thus, the split ratio of the front torque and the rear torque changes along a line l, as shown in FIGS. 5a and 5b. To the contrary, the torque to the rear wheels is reduced to eliminate slipping, thereby improving driveability to ensure good operability and safe driving.

When the slip ratio S becomes smaller than the set value $S_1$, the differential operation restricting torque becomes maximum by the pressure of oil in the third clutch 73. Thus, the carrier 61 is directly engaged with the second sun gear 54 to lock the central differential 50. Thus, the four-wheel driving is established in accordance with the torque split corresponding to the axle loads of the front and rear wheels as shown at a point $P_2$. Thus, the torque split is continuously controlled in accordance with the slip condition for preventing the slipping of the four wheels.

The manual switch 80 is closed when the vehicle is driven on a mountainous road. As a result, the solenoid 77a of the changeover valve 77 is energized, thereby operating the valve 77 to communicate the passage 76b with the passage 79. Thus, the oil is supplied to the oil chamber 72d of the second clutch 72 to engage the clutch 72 so that the third sun gear 55 is connected to the rear drive shaft 20 through the second intermediate shaft 52, the second clutch 72, and the driven drum 71a of the first clutch 71. Accordingly, the second mode, wherein the torque is distributed in accordance with the second standard torque split ratio, is selected. That is, split ratio $T_{F2}:T_{R2}$ is 25:75 in accordance with the radii of the third sun gear 55 and the third pinions 59. The torque is mainly transmitted to the rear wheels as shown by a point $P_1'$. The vehicle is in an oversteering condition so that good cornering maneuverability, driveability and steerability are obtained.

Although the rear wheels tend to slip in the second mode, the clutch torque Tc is produced in the third clutch 73 when the slip occurs. The clutch torque Tc transmitted to the front wheels increases along a line l' shown in FIG. 5a. Thus, the split ratio changes between the points $P_1'$ and $P_2$ at which the torque is equally distributed to the four wheels. Hence the slipping of the rear wheels is restrained to obtain good running performance.

Figure 6:
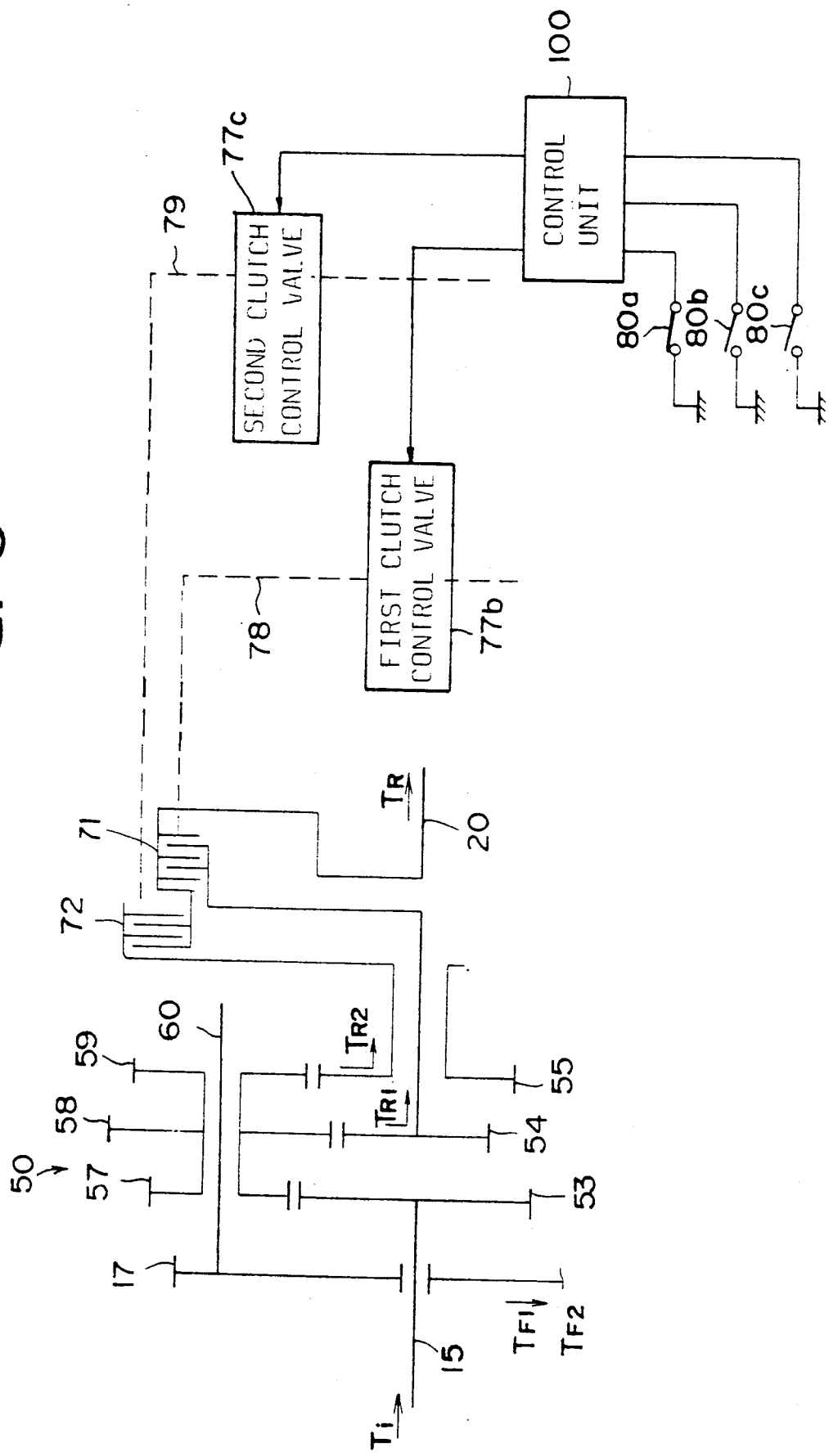
FIG. 6 schematic diagram showing the central differential, a clutch device, and a circuit for controlling the clutch device of modification of the first embodiment.

FIG. 6 shows a modification of the embodiment of the torque split system. In the modification, the second sun gear 54 and the third sun gear 55 are connected to the rear drive shaft 20 through the first clutch 71 and the second clutch 72, resepctively. The system is provided with a control unit 100 which applies control signals to a first clutch control valve 77b communicated with the first clutch 71, and to a second clutch control valve 77c communicated with the second clutch 72. The control unit 100 is connected to the first, second and third switches 80a, 80b and 80c. When the first switch 80a is closed, the first clutch 71 is engaged to provide the first mode and when the second switch is closed, the second clutch 72 is engaged to provide the second mode. When the third switch 80c is closed, both clutches 71, 72 are engaged, thereby locking the central differential 50 to provide a four-wheel drive mode.

Since a third clutch for restricting the differential operation of the central differential 50 is not provided, it is preferable to construct the central differential 50 so as to automatically generate a restricting torque in proportion to the input torque, thereby restricting the differential operation.

In the torque split control system of the present invention, the first and second clutches serve as a power train to the rear wheels. At the time when one of the clutches is being drained whereas the other is being supplied with oil, if oil pressure is low, an accident that neither of the clutches are engaged occurs due to low oil pressure, which means the cutting of the power train. If the front wheels or the rear wheels are on a road surface having a low friction coefficient in such a state and if the accelerator pedal is depressed a lot, the torque is greatly decreased and the engine speed abnormally increases.

Figure 7A:
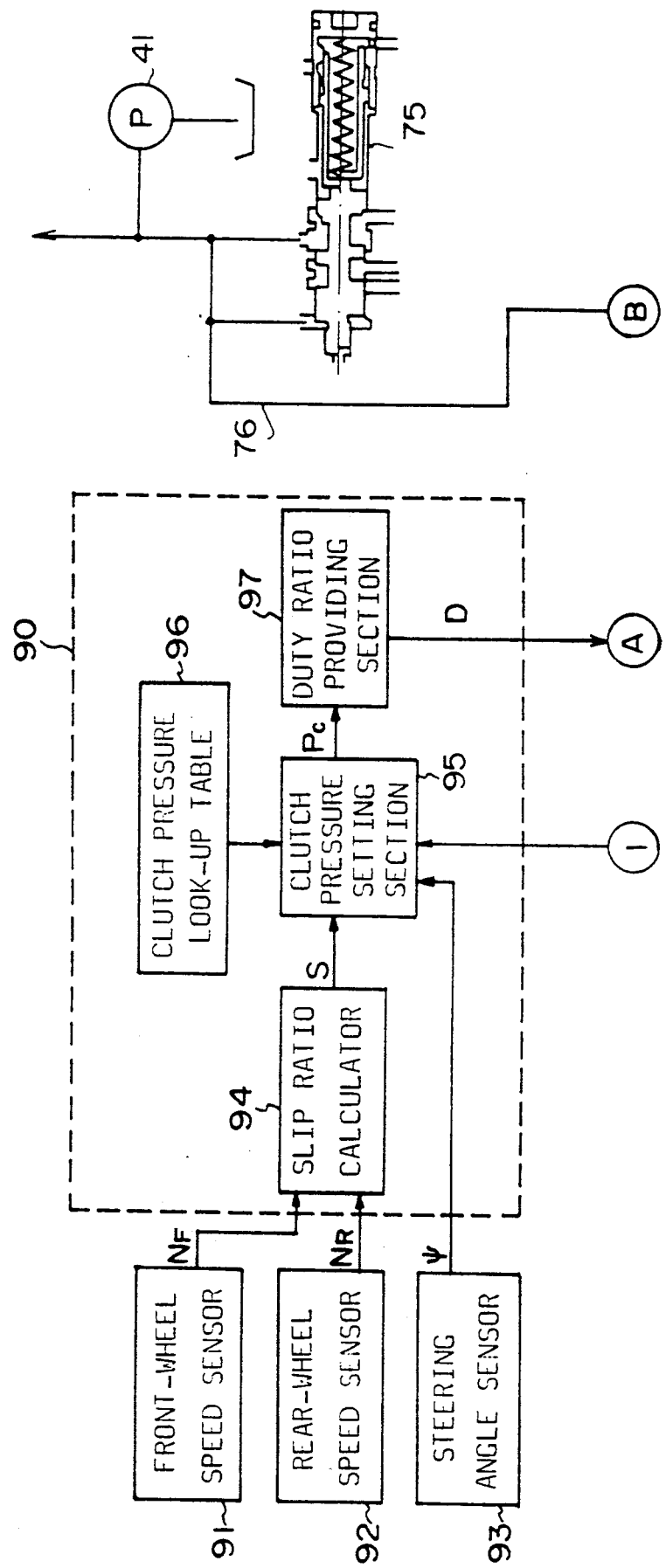
FIGS. 7a and 7b a circuit of a control system for the hydraulic clutche a second embodiment of the present invention.
Figure 7B:
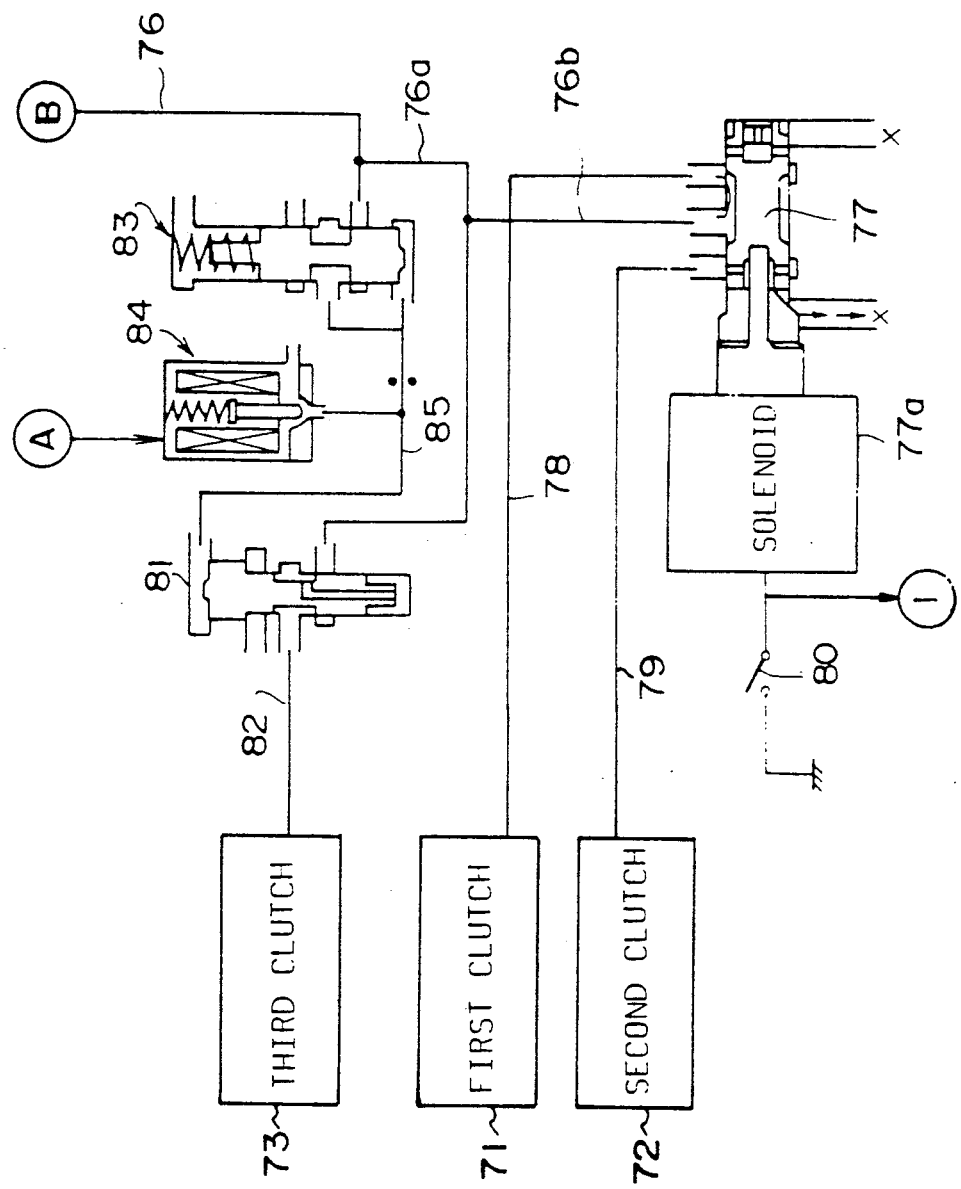

In order to avoid such a decrease of torque, in the torque split control system of the second embodiment the present invention is provided with a hydraulic control system shown in FIGS. 7a and 7b. A changeover signal from the switch 80 is applied to the clutch pressure setting section 95 of the control unit 90 when the torque distribution ratio mode is changed. Thus, the central differential 50 is prevented from becoming neutral.

More particuarly, when the switch 80 is closed to select the second torque split ratio mode, the oil in the first clutch 71 is drained so that the clutch pressure $Pc_1$ in the first clutch 71 starts to decrease as shown in the graph of FIG. 8a. The oil is supplied to the second clutch 72 so that the clutch pressure $Pc_2$ in the second clutch 72 starts to increase as shown in the graph of FIG. 8b. At the same time the changeover signal is fed to a clutch pressure setting section 95 of the control unit 90. The clutch pressure setting section 95 provides a high clutch pressure Pc for a predetermined period t. As a result, a predetermined clutch torque Tc corresponding to the set clutch pressure Pc is generated in the third clutch 73, thereby temporarily rendering the central differential 50 in a locked state or a slipping state. The power train is maintained for the period t, in which time, the second clutch 72 is sufficiently engaged. After the period t, the clutch pressure Pc decreases thereby releasing the third clutch 73. The control system is operated in the same manner when the switch 80 is opened to change the torque split ratio mode from the second mode to the first mode.

Figure 9:
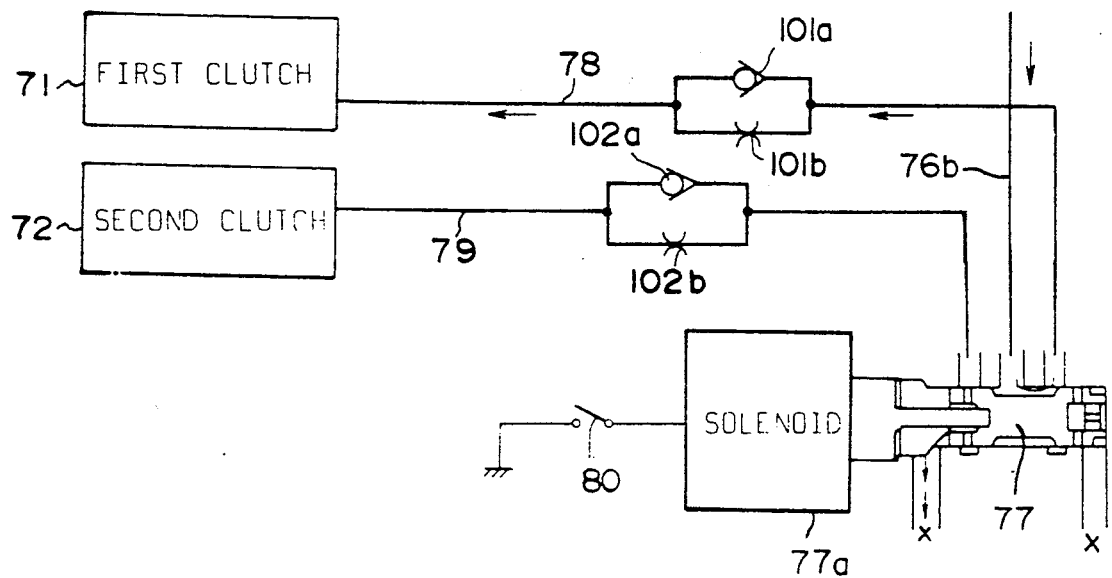
FIG. 9 is a schematic diagram showing a part of a circuit for controlling the clutches in the modification of the second embodiment.

Referring to FIG. 9 showing a hydraulic circuit of the control system of a modification of the second embodiment of the present invention, the releasing timings of the clutches are automatically retarded. The oil passage 78 connecting the changeover valve 77 with the first clutch 71 has a check valve 101a and an orifice 101b disposed in parallel with the check valve 101a. The oil passage 79 connecting the changeover valve 77 with the second clutch 72 similarly has a check valve 102a and an orifice 102b in parallel to the check valve 102a. When the changeover valve 77 is operated to connect the oil passage 76b with the passage 79, the oil is applied to the second clutch 72 passing the check valve 102a. To the contrary, the check valve 101a in the passage 78 is closed so that the oil is slowly drained through the orifice 101b. Hence as shown by the dotted line in FIG. 8a, the clutch pressure $Pc_1$ in the first clutch 71 gradually reduces so that the clutches are maintained to provide the first mode until the second clutch 72 is fully engaged.

Thus, in accordance with the second embodiment of the present invention, the central differential 50 is operated while the torque split ratios are changed so that the decrease of torque and abnormal rising of the engine speed are prevented. In particular, the system where the differential 50 is locked by the third clutch, restrains shock which occurs at the change of torque split ratio.

Figure 10:
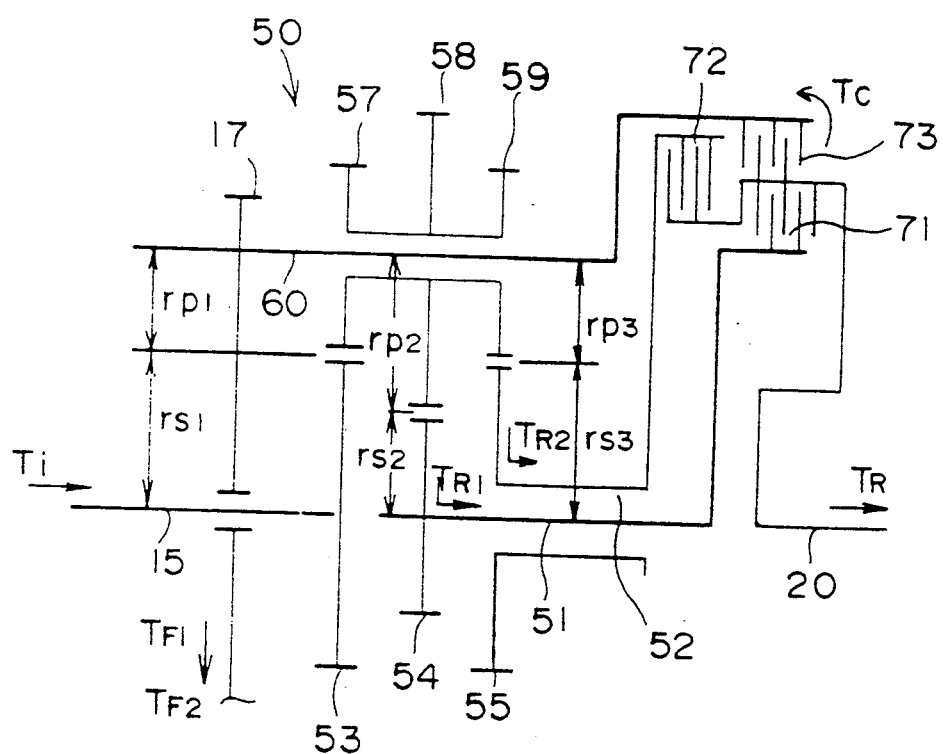
FIG. 10 is a schematic view showing the central differential and the clutch device of a control system of a third embodiment of the present embodiment.

In the third embodiment of the present invention shown in FIG. 10, the central differential 50 is so arranged that the first sun gear 53 is equal to the third sun gear 55 and the first pinion 57 is equal to the third pinion 59 in the number of the teeth, the module, and the pitch circle. Therefore, $$rs_1 = rs_3, \quad rp_1 = rp_3$$

Substituting the above equations for the equations (6) to (9) hereinbefore described, $$T_{F1} = (1 - rp_1 \cdot rs_2 / rs_1 \cdot rp_2) \cdot Ti$$

$$T_{R1} = (rp_1 \cdot rs_2 / rs_1 \cdot rp_2) \cdot Ti$$

$$T_{F2} = 0, \quad T_{R2} = Ti$$

Thus, a second standard torque split ratio where the torque is completely split to the rear wheels is obtained.

If $rs_1$ and $rs_3$ are 22.8 mm, $rp_1$ and $rp_3$ are 17.1 mm, $rp_2$ is 21.8 mm and $rs_2$ is 18.1 mm, the front torque $T_F$ and the rear torque $T_R$ are calculated as $$T_{F1} \approx 0.38 Ti$$

$$T_{R1} \approx 0.62 Ti$$

Thus, the first standard torque split ratio obtained through the second sun gear 54 is $$T_{F1} : T_{R1} \approx 38:62$$

Figure 11A:
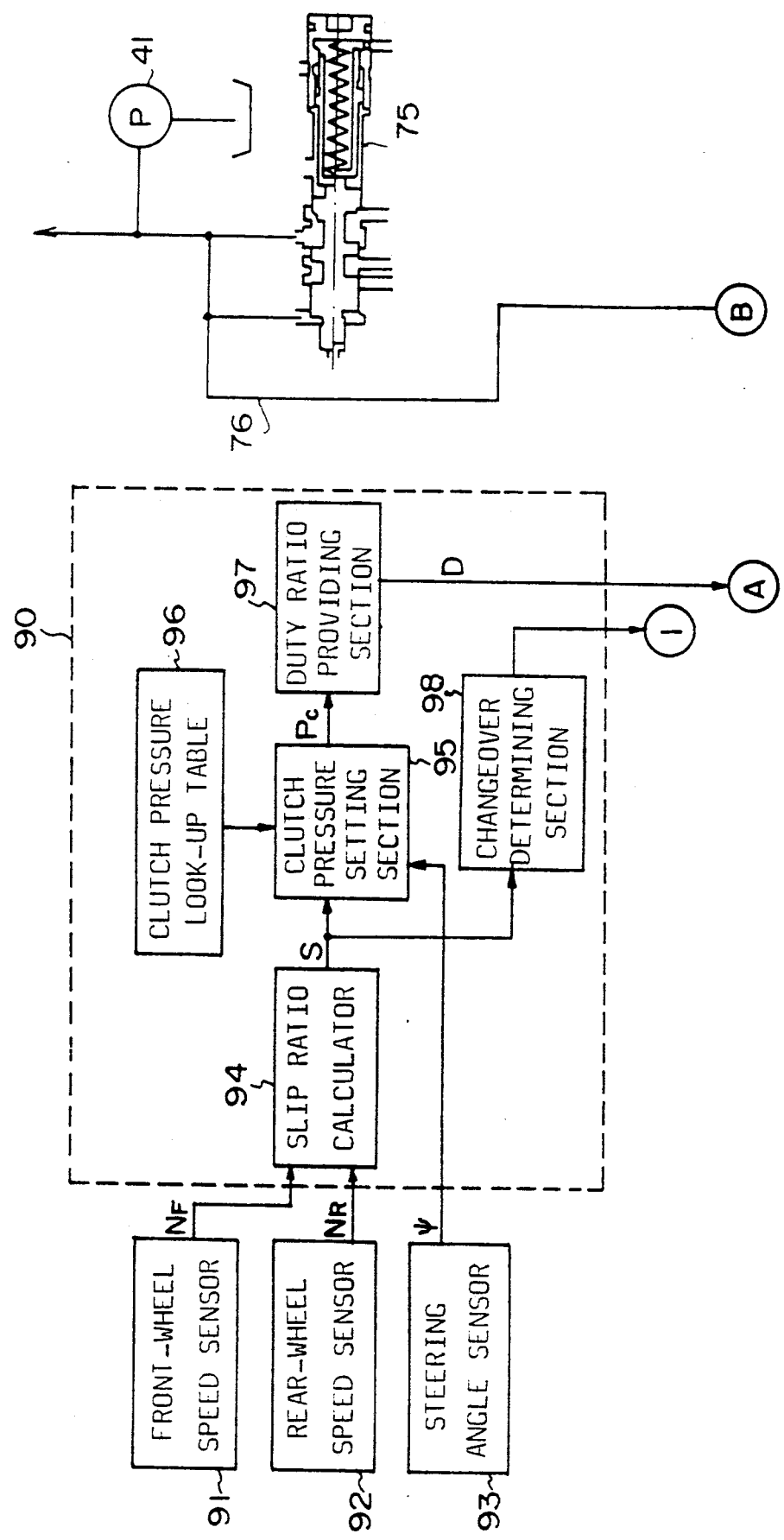
FIGS. 11a and 11b show a circuit of a control system for a hydraulic clutches of the third embodiment.
Figure 11B:
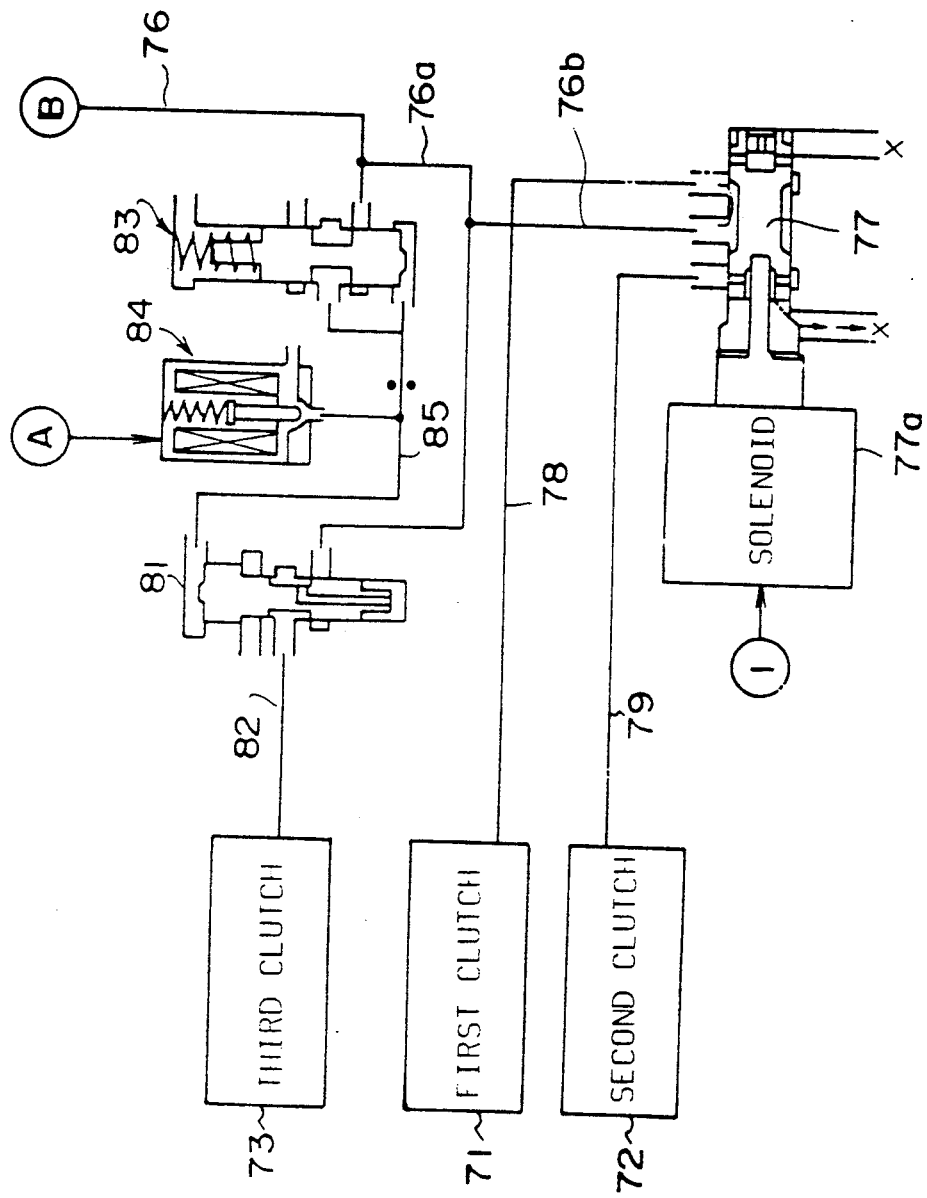

Referring to FIGS. 11a and 11b, the control unit 90 of the present embodiment is provided with a changeover determining section 98 which is fed with the slip ratio S from the slip ratio calculator 94. The changeover determining section 98 applies a signal to the solenoid 77a of the changeover valve 77 in dependency on the slip ratio S. Namely, while the wheels do not slip so that the slip ratio S is larger than a predetermined reference ratio $S_R$, the changeover valve 77 is operated to engage the second clutch 72. On the other hand, when the slip ratio S becomes smaller than the reference ratio $S_R$, the changeover valve 77 is automatically operated to engage the first clutch 71.

Figure 12A:
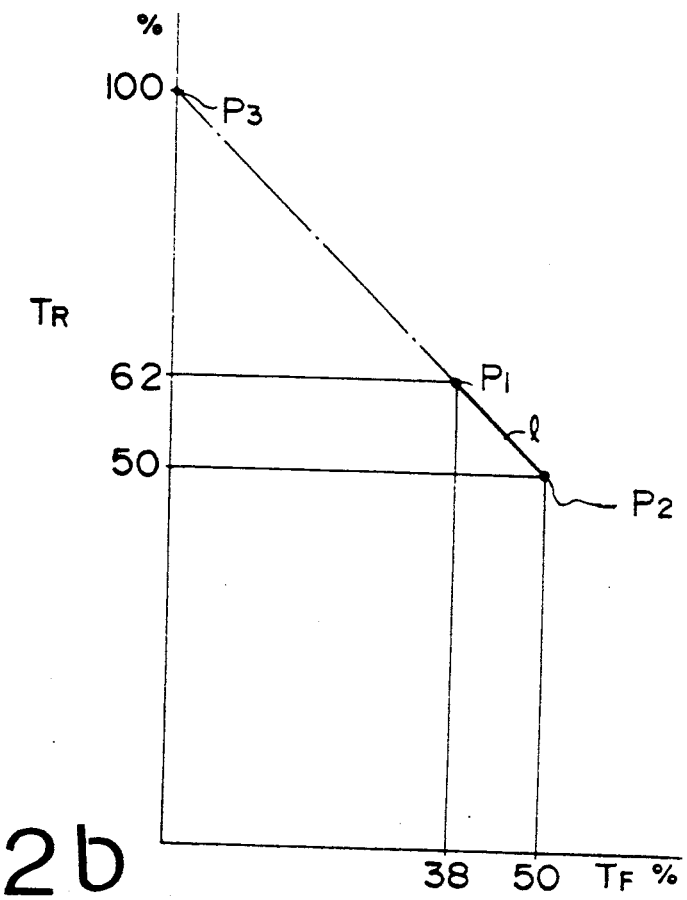
FIG. 12a is a graph showing a relationship between front torque and rear torque in the third embodiment.
Figure 12B:
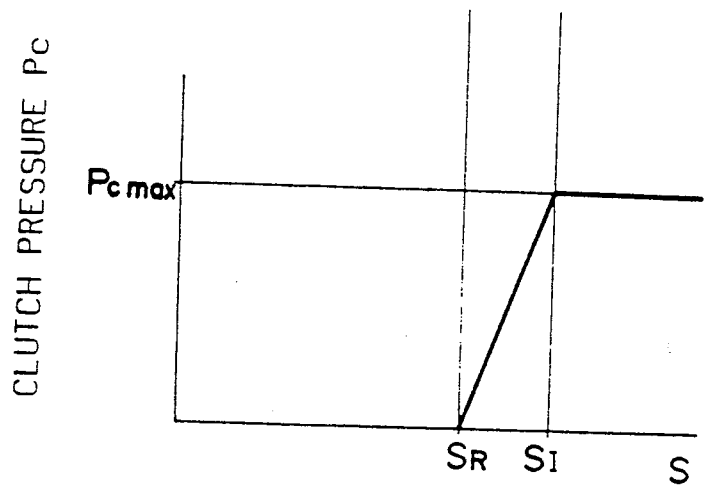
FIG. 12b is a graph showing characteristics of clutch pressure in accordance with slip ratio.

When the vehicle is driven on a dry road where the slipping of the wheels does not occur, the changeover determining means 98 feeds a signal to operate the solenoid 77a of the changeover valve 77 to communicate the oil passage 76b with the passage 79. The second clutch 72 is engaged so that the rear drive shaft 20 is connected to the third sun gear 55 through the second intermediate shaft 52. The second standard torque split ratio is selected as shown by a point $P_3$ in FIG. 12a, thereby transmitting the torque only to the rear wheels through the third sun gear 55, second intermediate shaft 52, second clutch 72, the rear drive shaft 20, the propeller shaft 21 and the rear differential 22. Hence, the vehicle is driven by the rear wheels although the central differential 50 is provided.

Meanwhile, the carrier 61 connected to the front wheels idles so that when the vehicle makes a turn, the carrier 61 is freely rotated. Since the vehicle is driven under the oversteering condition, maneuverability, driveability, and steerability are improved.

When the rear wheels slip so that the slip ratio S becomes smaller than the reference slip ratio $S_R$, the changeover determining section 98 applies a signal to de-energize the solenoid 77a of the changeover valve 77, thereby communicating the passages 76b and 78. Thus, the first clutch 71 is engaged so that the rear drive shaft 20 is connected with the second sun gear 54 through the first intermediate shaft 51. The first standard torque split ratio mode is hence determined, thereby transmitting the torque to the front and the rear wheels at the ratio of $T_{F1}:T_{R1} \approx 38:62$ as shown at the point $P_1$ in FIG. 12a. In the first standard torque split ratio mode, since the torque is distributed to the four wheels, slipping of the wheels is restrained, thereby enhancing good running performance and stable driving.

If an excessive torque is transmitted when the vehicle is driven on a slippery road, the rear wheels to which a larger torque is transmitted are apt to slip so that the slip ratio S decreases. The oil is applied to the third clutch 73 so that the clutch 73 is operated to increase the torque transmitted to the front wheels in the manner described in the description of the first embodiment. Therefore, the slipping of the wheels is prevented, and the vehicle is driven in an understeering condition so that the running performance and the stability of the vehicle are improved.

When the vehicle is driven on a road having an extremely low friction coefficient such as an icy road, or when stuck in mud or in sand, the slip ratio S becomes smaller than the set value $S_1$, the clutch pressure Pc applied to the third clutch 73 becomes maximum, thereby locking the central differential 50. The four-wheel driving is established so that the running performance is enhanced.

The present embodiment may be modified to manually operate the changeover valve, or in accordance with other factors besides the slip ratio S. In a vehicle having an antilock braking system on a brake system, when the antilock braking is effected, an ABS actuating signal is applied to the clutch pressure setting section 95 to render the clutch pressure Pc zero, thereby releasing the clutch 73.

In the central differential 50 of the fourth embodiment of the present invention, each set of the first to third pinion has three pinions.

The engagement conditions for equiangularly disposing a plurality of pinions will be described with reference to FIGS. 13a to 13c.

Figure 13A:
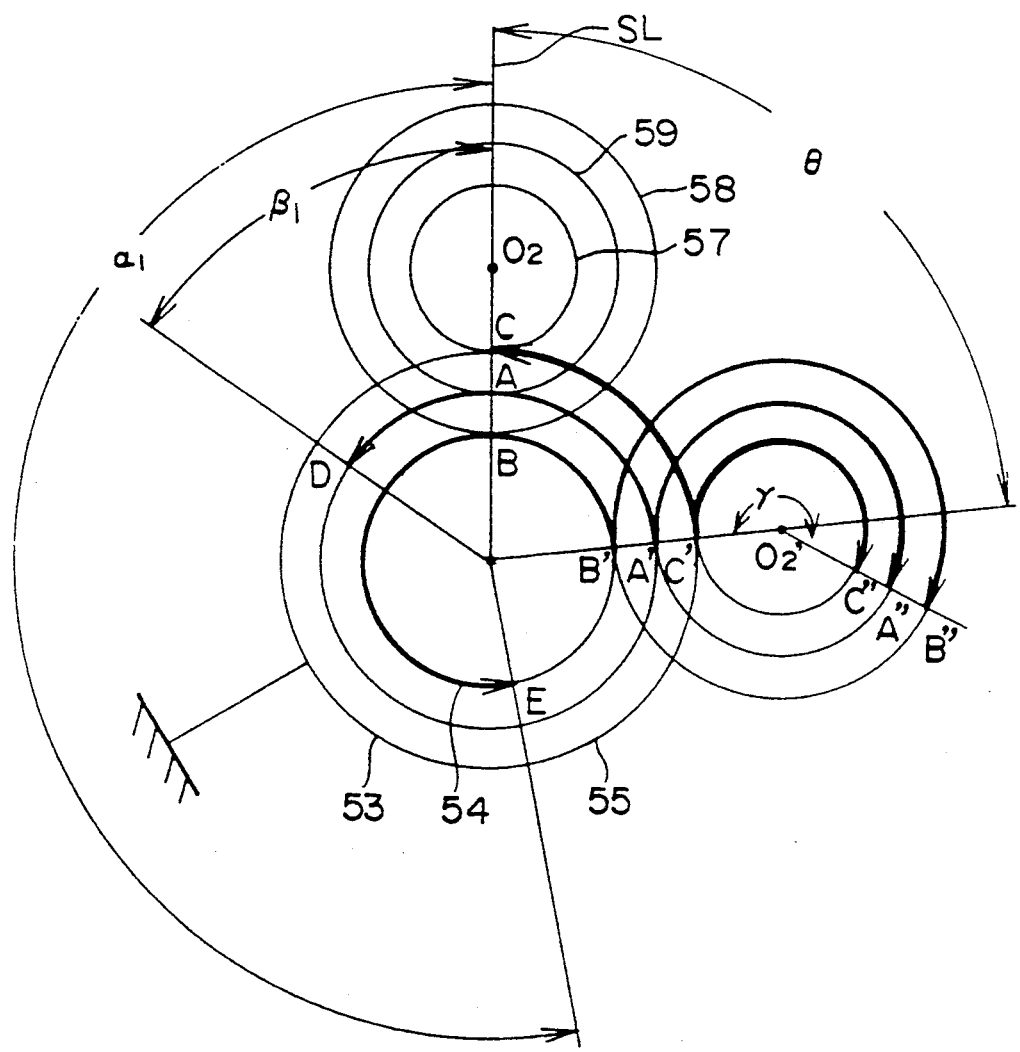
FIGS. 13a, 13b and 13c are explanatory illustrations showing engagement of pinions of a central differential provided in a fourth embodiment of the present invention.

Referring to FIG. 13a, if the first sun gear 53 is fixed and the first, second and third pinions 57, 58 and 59 are revolved an angle $\theta$ in the clockwise direction from a standard line SL, the second sun gear 54 is rotated by an angle $\alpha_1$ in a counterclockwise direction and the third sun gear is rotated by an angle $\beta_1$ in a counterclockwise direction. The angle $\theta$ is expressed as follows.

$$\theta = r_{s2} \cdot r_{p1} \cdot \alpha_1 / (r_{s1} \cdot r_{p3} - r_{s3} \cdot r_{p1}) \quad (10)$$

$$\theta = r_{s3} \cdot r_{p1} \cdot \beta_1 / (r_{s1} \cdot r_{p2} - r_{s2} \cdot r_{p1}) \quad (11)$$

If the number of the teeth of the first sun gear 53 is $Z_{s1}$, the number of the teeth of the second sun gear 54 is $Z_{s2}$, the number of the teeth of the third sun gear is $Z_{s3}$, the number of the teeth of the first pinion 57 is $Z_{p1}$, the number of the teeth of the second pinion 58 is $Z_{p2}$, and the number of the teeth of the third pinion 59 is $Z_{p3}$, the equations (10) and (11) are substituted as follows in accordance with the numbers of the teeth.

$$\theta = Z_{s2} \cdot Z_{p1} \alpha_1 / (Z_{s1} \cdot Z_{p3} - Z_{s3} \cdot Z_{p1}) \quad (12)$$

$$\theta = Z_{s3} \cdot Z_{p1} \cdot \beta_1 / (Z_{s1} \cdot Z_{p2} - Z_{s2} \cdot Z_{p1}) \quad (13)$$

If the second sun gear 54 is rotated by a circular pitch angle $360/Z_{s2}$ and the third sun gear 55 is rotated by a circular angle $360/Z_{s3}$, each from the standard line, the angle $\theta$ is represented as $$\theta = Z_{p1} \cdot 360 / (Z_{s1} \cdot Z_{p3} - Z_{s3} \cdot Z_{p1}) \quad (14)$$

$$\theta = Z_{p1} \cdot 360 / (Z_{s1} \cdot Z_{p2} - Z_{s2} \cdot Z_{p1}) \quad (15)$$

Figure 13B:
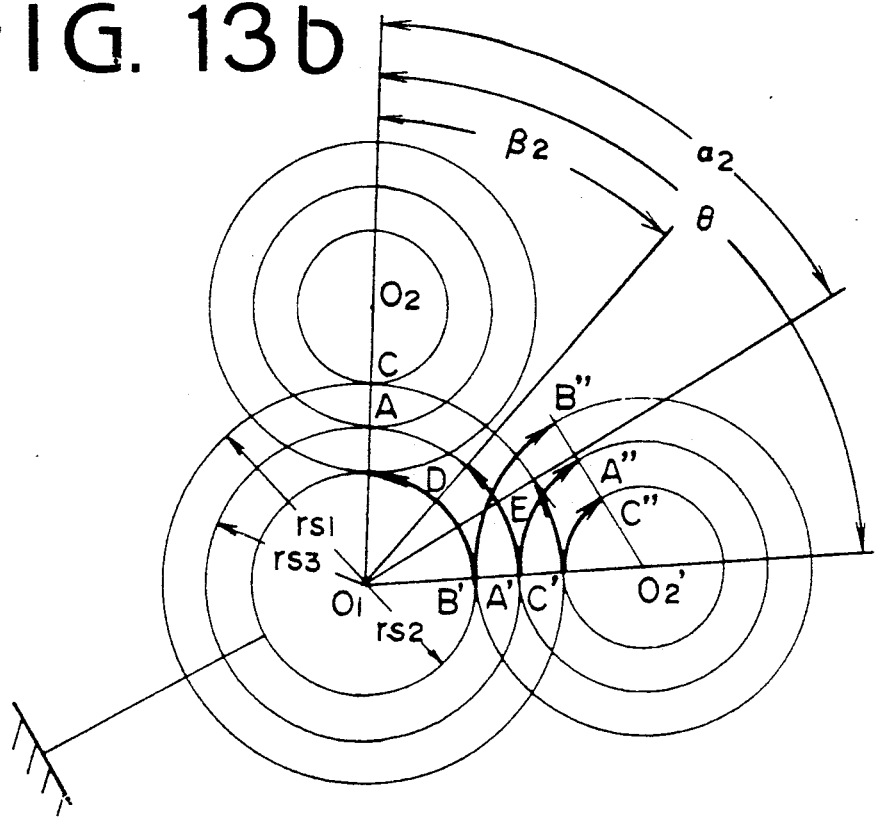

Referring to FIG. 13b, if the second sun gear 54 is fixed and the first, second and third pinions 57, 58 and 59 are revolved by the angle $\theta$ in the clockwise direction, the first sun gear 53 is rotated by an angle $\beta_2$ in the clockwise direction and the third sun gear 55 is rotated by an angle $\alpha_2$ in the clockwise direction. The angle $\theta$ is expressed as $$\theta = -Z_{s3} \cdot Z_{p2} \cdot \beta_2 / (Z_{s2} \cdot Z_{p1} - Z_{s1} \cdot Z_{p2}) \quad (16)$$

$$\theta = -Z_{s1} \cdot Z_{p2} \cdot \alpha_2 / (Z_{s3} \cdot Z_{p2} - Z_{s2} - Z_{s2} \cdot Z_{p3}) \quad (17)$$

Substituting $\beta_2 = 360/Z_{s3}$ and $\alpha_2 = 360/Z_{s1}$ in the equations (16) and (17), $$\theta = -Z_{p2} \cdot 360 / (Z_{s2} \cdot Z_{p1} - Z_{s1} \cdot Z_{p2}) \quad (18)$$

$$\theta = -Z_{p2} \cdot 360 / (Z_{s3} \cdot Z_{p2} - Z_{s2} \cdot Z_{p3}) \quad (19)$$

Figure 13C:
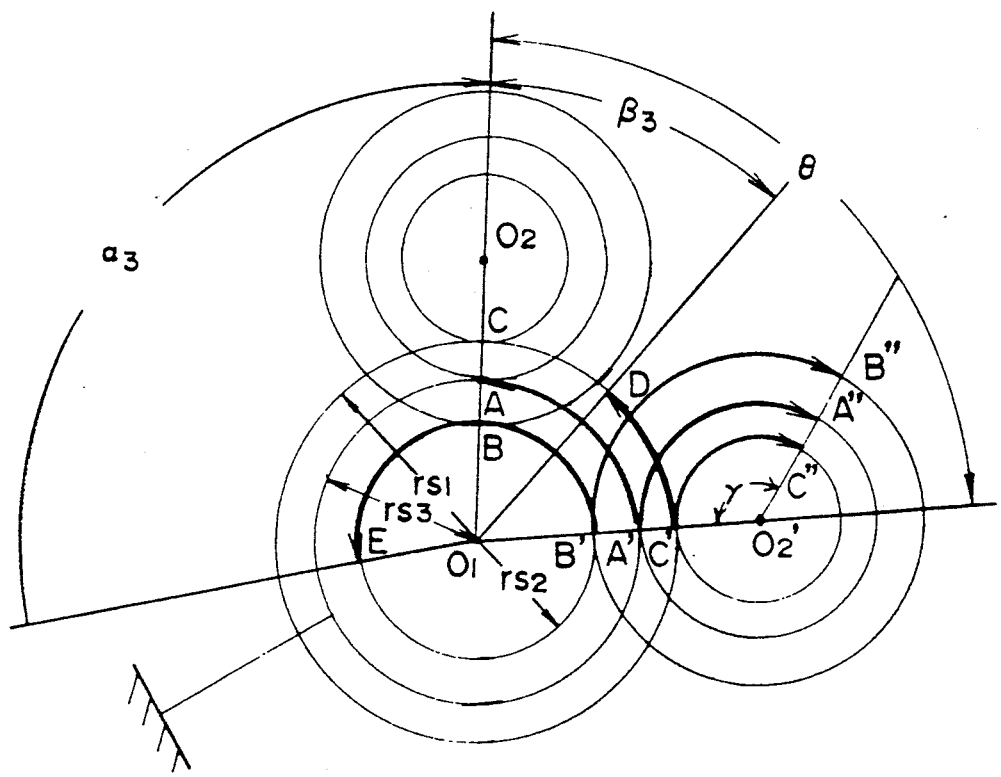

Referring to FIG. 13c, if the third sun gear 55 is fixed and the first, second and third pinions 57, 58 and 59 are revolved by the angle $\theta$ in the clockwise direction, the first sun gear 53 is rotated by an angle $\beta_3$ in the clockwise direction and the second sun gear 54 is rotated by an angle $\alpha_3$ in the clockwise direction. The angle $\theta$ is expressed as $$\theta = Z_{p3} \cdot Z_{s2} \cdot \alpha_3 / (Z_{p3} \cdot Z_{s2} - Z_{p2} \cdot Z_{s3}) \quad (20)$$

$$\theta = -Z_{p3} \cdot Z_{s1} \cdot \beta_3 / (Z_{p1} \cdot Z_{s3} - Z_{s1} \cdot Z_{p3}) \quad (21)$$

Substituting $\alpha_3 = 360/Z_{s2}$ and $\beta_3 = 360/Z_{s3}$ in the equations (20) and (21).

$$\theta = Z_{p3} \cdot 360 / (Z_{p3} \cdot Z_{s2} - Z_{p2} \cdot Z_{a3}) \quad (22)$$

$$\theta = -Z_{p3} \cdot 360 / (Z_{p1} \cdot Z_{s3} - Z_{s1} \cdot Z_{p3}) \quad (23)$$

If a number N of the pinons are equiangularly disposed, the disposition angle between a first pair of the pinions and a second pair of the pinions is 360/N. It will be seen that integer times of a value is obtained by integrally multiplying the number N from the equations (14), (15), (18), (19), (22) and (23). Consequently, for evenly spaced pinions the equation is $$\begin{aligned} m_1 &= (Z_{s1} \cdot Z_{p3} - Z_{s3} \cdot Z_{p1})/Z_{p1} \cdot N \\ &= (Z_{s1} \cdot Z_{p2} - Z_{s2} \cdot Z_{p1})/Z_{p1} \cdot N \end{aligned} \quad (24)$$

$$\begin{aligned} m_2 &= -(Z_{s2} \cdot Z_{p1} - Z_{s1} \cdot Z_{p2})/Z_{p2} \cdot N \\ &= -(Z_{s3} \cdot N_{p2} - Z_{s2} \cdot Z_{p3})/Z_{p2} \cdot N \end{aligned} \quad (25)$$

$$\begin{aligned} m_3 &= (Z_{s2} \cdot Z_{p3} - Z_{s3} \cdot Z_{p2})/Z_{p3} \cdot N \\ &= -(Z_{s3} \cdot Z_{p1} - Z_{s1} \cdot Z_{p3})/Z_{p3} \cdot N \end{aligned} \quad (26)$$

The number of the teeth of each pinion is obtained from the equations (24), (25) and (26). If $Z_{p1} = Z_{p2} = Z_{p3}$, the equations are simplified as follows.

$$\left. \begin{aligned} m_1 &= (Z_{s1} - Z_{s2})/N \\ m_2 &= (Z_{s3} - Z_{s2})/N \\ m_3 &= (Z_{s1} - Z_{s3})/N \end{aligned} \right\} \quad (27)$$

It will be seen that the differences among the number of the teeth of the first sun gear 53, the number of the teeth of the second sun gear 54 and the number of the teeth of the third sun gear 55 are integrally multiplied by the number N of the pinion set of the first, second and third pinions 57, 58 and 59. If the module m' of the first pinion 57, the module m'' of the second pinion 58 and the module m''' of the third pinion 59 are m''>m'''>m' even if the number of the teeth is $Z_{p1} = Z_{p2} = Z_{p3}$, the pitch circles become $r_{p1} < r_{p3} < r_{p2}$.

Here, $Z_{s1}$ is 24, $Z_{p1}$, $Z_{p2}$ and $Z_{p3}$ are 18, respectively, $Z_{s2}$ is 15, $Z_{s3}$ is 18 and N is 3. If helical gears are used, and the module of each of the teeth $Z_{s1}$ and $Z_{p1}$ is 1.5, the module of each of the teeth $Z_{s2}$ and $Z_{s2}$ is 1.75 and the module of each of the teeth $Z_{p3}$ and $Z_{s3}$ is 1.72 and if $rs_1$ is 22.8 mm, $rp_1$ is 17.1 mm, $rp_2$ is 21.8 mm and $rs_2$ is 18.1 mm, and $rs_3$ and $rp_3$ are 19.95, respectively, $$m_1 = (24 - 15)/3 = 3$$

$$m_2 = (18 - 15)/3 = 1$$

$$m_3 = (24 - 18)/3 = 2$$

Consequently, the three pinion sets, in which the first, second and third pinions of 57, 58 and 59 each group are arranged at the same phase with of each other, can be equiangularly disposed.

Thus, the balance of mass among the three pinions are ensured during the operation, thereby improving the durability of the bearings and reducing noise and vibration of the central differential 50.

Further, since the three pinions of each group are in the same phase and a plurality of the pinion sets are equiangularly disposed by determining the number of the teeth and measurements of the gears, assembling and workability of the planetary gear device are improved. It is possible to simplify manufacturing of the gears and to reduce parts of the pinions.

Since the measurements of the gears between the first sun gear and the pinion and between the second sun gear and the pinion and between the third sun gear and the pinion can be preferably changed, a wide control of the torque split can be performed. Thus, operability and driveability of the vehicle are accurately and properly controlled, thereby improving efficiencies thereof.

The present invention may be adapted to a vehicle with a manual transmission or a continuously variable belt-drive automatic transmission, or to a vehicle with a laterally mounted engine.

From the foregoing it will be understood that the present invention provides a torque split control system for a four-wheel drive vehicle where at least two standard torque split ratios are obtained, thereby providing stability of the vehicle, good cornering performance, handling and steerability in accordance with the road conditions and driving conditions so that driving performance is improved. Since the central differential comprises a complex planetary gear device, a sufficient torque is distributed to the rear wheels.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a system for controlling torque split for a four-wheel drive vehicle having a transmission, a central differential for splitting output torque of the transmission at a predetermiend ratio, power trains for transmitting the split torques from output members of the central differential to front and rear wheels of the vehicle, the improvement of the system, which comprises:

said central differential comprising an input sun gear operatively conencted with an output shaft of said transmission, a plurality of output sun gears coaxial with said input sun gear, a carrier operatively conencted to a set of driving wheels of said vehicle, a pinion member comprising a plurality of planetary pinions which are different in the number of teeth and integral with each other and rotatably supported on said carrier, each of said planetary pinions being engaged with corresponding ones of said sun gears and an output member operatively conencted to another set of driving wheels;

selecting means for selectively connecting one of said output sun gears to said output member; and a control unit for operating said selecting means in accordance with driving conditions of the vehicle so as to select one of said output sun gears.

2. The system according to claim 1, wherein said selecting means includes fluid operated friction clutches.

3. The system according to claim 1, wherein the input sun gear and selected one of said output sun gears are equal in the number of teeth and is module, and the pinion engaged with the input sun gear and the pinion engaged with said selected one of said output sun gears are equal in the number of the teeth and in module.

4. The system according to claim 1 further comprising:

a fluid operated multiple-disk clutch provided to restrict the differential operation of the central differential.

5. The system according to claim 1, wherein said plurality of planetary pinions are arranged at the same phase; and a plurality of said pinion members are equiangularly disposed around said sun gears.

6. The system according to claim 1, further comprising:

means for rendering said central differential operative during a period of time when said selecting means operates to select one of said output sun gears, thereby preventing a decrease of the split torque during the period.

* * * * *